United States Patent
Girod et al.

(10) Patent No.: US 7,075,986 B2
(45) Date of Patent: *Jul. 11, 2006

(54) METHOD AND APPARATUS FOR PROVIDING SCALABLE PRE-COMPRESSED DIGITAL VIDEO WITH REDUCED QUANTIZATION BASED ARTIFACTS

(75) Inventors: Bernd Girod, Spardorf (DE); Staffan Ericsson, Brookline, MA (US); Yuriy A. Resznik, Seattle, WA (US); Nikolaus Farber, Erlangen (DE)

(73) Assignee: RealNetworks, Inc., Seattle, WA (US)

( * ) Notice: Subject to any disclaimer, the term of this patent is extended or adjusted under 35 U.S.C. 154(b) by 737 days.

This patent is subject to a terminal disclaimer.

(21) Appl. No.: 10/292,257

(22) Filed: Nov. 12, 2002

(65) Prior Publication Data

US 2003/0072370 A1 Apr. 17, 2003

Related U.S. Application Data

(63) Continuation of application No. 09/177,406, filed on Oct. 23, 1998, now Pat. No. 6,480,541, which is a continuation-in-part of application No. 08/753,618, filed on Nov. 27, 1996, now abandoned.

(51) Int. Cl.
*H04N 7/12* (2006.01)

(52) U.S. Cl. .................... 375/240.12; 382/236
(58) Field of Classification Search ........... 375/240.12, 375/240.03, 240.04, 240.01, 240.1, 240.13; 370/465, 232; 348/415.1; 382/236
See application file for complete search history.

(56) References Cited

U.S. PATENT DOCUMENTS

| | | | |
|---|---|---|---|
| 4,868,653 A | 9/1989 | Golin et al. | |
| 5,065,447 A | 11/1991 | Barnsley et al. | |
| 5,079,630 A | 1/1992 | Golin et al. | |
| 5,122,873 A | 6/1992 | Golin | |
| 5,134,476 A * | 7/1992 | Aravind et al. | 348/415.1 |
| 5,225,904 A | 7/1993 | Golin et al. | |
| 5,241,383 A * | 8/1993 | Chen et al. | 375/240.04 |
| 5,253,058 A | 10/1993 | Gharavi | |
| 5,262,855 A | 11/1993 | Alattar et al. | |
| 5,325,124 A | 6/1994 | Keith | |
| 5,347,600 A | 9/1994 | Barnsley et al. | |

(Continued)

*Primary Examiner*—Gims Philippe
(74) *Attorney, Agent, or Firm*—Kudirka & Jobse, LLP; Steven E. Stewart

(57) ABSTRACT

A method for generating a digital motion video sequence at a plurality of bit rates uses a transitional coding source when switching between bitstreams having different bit rates during transmission of a video sequence. The transitional data may be frames coded using reconstructed frames reconstructed for a first bitstream using the characteristics of the second bitstream. These "low bit rate insert frames," or LBIFs, contain the image characteristics of a signal coded at the lower bit rate. With a bitstream having a higher bit rate being periodically coded using an LBIF, a point of image continuity between the two bitstreams is provided. Thus, switching from one bitstream to the other at this point in the video sequence minimizes the production of artifacts caused by differences in bit rate. In another embodiment of the invention, a separate set of transitional data is created, taking the form of "switch" frames, or S-frames. The S-frames are typically the difference between a frame of a first bitstream and a frame of a second bitstream. These frames are inserted into the decoded bitstream during the transition from one bitstream to the other, and compensate for any visual artifacts that might otherwise occur due to the difference in bit rate of the two bitstreams.

23 Claims, 17 Drawing Sheets

U.S. PATENT DOCUMENTS

| | | |
|---|---|---|
| 5,363,139 A | 11/1994 | Keith |
| 5,384,598 A | 1/1995 | Rodriguez et al. |
| 5,384,867 A | 1/1995 | Barnsley et al. |
| 5,392,396 A | 2/1995 | MacInnis |
| 5,416,520 A | 5/1995 | Kuzma |
| 5,418,568 A | 5/1995 | Keith |
| 5,430,812 A | 7/1995 | Barnsley et al. |
| 5,485,211 A | 1/1996 | Kuzma |
| 5,491,513 A | 2/1996 | Wickstrom et al. |
| 5,508,732 A | 4/1996 | Bottomley et al. |
| 5,604,731 A * | 2/1997 | Grossglauser et al. ...... 370/232 |
| 5,706,290 A * | 1/1998 | Shaw et al. .................. 370/465 |
| 6,088,392 A * | 7/2000 | Rosenberg ............. 375/240.03 |
| 6,480,541 B1 * | 11/2002 | Girod et al. ........... 375/240.12 |

* cited by examiner

METHOD AND APPARATUS FOR PROVIDING SCALABLE PRE-COMPRESSED DIGITAL VIDEO WITH REDUCED QUANTIZATION BASED ARTIFACTS

CROSS-REFERENCE TO RELATED APPLICATIONS

This is a continuation of U.S. patent application Ser. No. 09/177,406, filed Oct. 23, 1998 now U.S. Pat. No. 6,480, 541, which is a continuation-in-part of Ser. No. 08/753,618, filed Nov. 27, 1996 now abandoned.

FIELD OF THE INVENTION

This invention relates to the field of compressed motion video and, more specifically, to pre-compressed, stored video for video-on-demand applications.

BACKGROUND OF THE INVENTION

Digital video signals are typically compressed for transmission from a source to a destination. One common type of compression is "interframe" coding, such as is described in the International Telecommunications Union-Telecommunications (ITU-T) Recommendations H.261 and H.262, or the Recommendation H.263. Interframe coding exploits the spatial similarities of successive video frames by using previous coded and reconstructed video frames to predict the current video signal. By employing a differential pulse code modulation (DPCM) loop, only the difference between the prediction signal and the actual video signal amplitude (i.e. the "prediction error") is coded and transmitted.

In interframe coding, the same prediction is formed at the transmitter and the receiver, and is updated frame-by-frame at both locations using the prediction error. If a transmission error causes a discrepancy to arise between the prediction signal at the transmitter and the prediction signal at the receiver, the error propagates temporally over several frames. Only when the affected region of the image is updated by an intraframe coded portion of the transmission (i.e. a frame coded without reference to a previous frame), will the error propagation be terminated. In practice, this error propagation may result in an annoying artifact which may be visible for several seconds in the decoded, reconstructed signal.

Shown in FIG. 1 is a schematic representation of a conventional hybrid interframe coder 10. Only the fundamental elements of the coder are shown in FIG. 1. However, this type of hybrid coder is known in the art, and the omitted elements are not germane to understanding its operation.

The coder of FIG. 1 receives an input video signal at summing node 12. The output of summing node 12 is a subtraction from a current frame of the input signal, of a motion-compensated version of a previous frame of the input signal (discussed in more detail hereinafter). The output of summing node 12 is received by discrete cosine transform block 14 (hereinafter DCT 14). The DCT 14 is a hardware, software, or hybrid hardware/software component that performs a discrete cosine transform on the data received from the summing node 12, in a manner well-known in the art. The result is the transform of the incoming video signal (one block of elements at a time) to a set of coefficients which are then input to quantizer 16. The quantizer 16 assigns one of a plurality of discrete values to each of the received coefficients, resulting in an amount of compression provided by the quantizer which depends on the number of quantization levels used by the quantizer (i.e. the "coarseness" of the quantization). Since the quantizer maps each coefficient to one of a finite number of quantization levels, there is an error introduced by the quantizer, the magnitude of which increases with a decreasing number of quantization levels.

In order to perform the desired interframe coding, the output of quantizer 16 is received by an inverse quantizer 17 and an inverse discrete cosine transform element (hereinafter "inverse DCT") 18. Inverse quantizer 17 maps the quantizer index into a quantizer representative level. The inverse DCT 18 is a hardware, software, or hybrid hardware/software component that performs an inverse discrete cosine transform on the data received from inverse quantizer 17, in a manner well-known in the art. This inverse transform decodes the coded data to create a reconstruction of the prediction error. The error introduced into the signal by quantizer 16 reduces the quality of the image which is later decoded, the reduced quality being a side effect of the data compression achieved through quantization.

The decoded version of the video signal is output by summing node 19, and is used by the coder 10 to determine variations in the video signal from frame to frame for generating the interframe coded signal. However, in the coder of FIG. 1, the decoded signal from summing node 19 is first processed using some form of motion compensation means (hereinafter "motion compensator") 20, which works together with motion estimator 21. Motion estimator 21 makes motion estimations based on the original input video signal, and passes the estimated motion vectors to both motion compensator 20 and entropy coder 23. These vectors are used by motion compensator 20 to build a prediction of the image by representing changes in groups of pixels using the obtained motion vectors. The motion compensator 20 may also include various filtering functions known in the art.

At summing node 12, a frame-by-frame difference is calculated, such that the output of summing node 12 is only pixel changes from one frame to the next. Thus, the data which is compressed by DCT 14 and quantizer 16 is only the interframe prediction error representing changes in the image from frame to frame. This compressed signal may then be transmitted over a network or other transmission media, or stored in its compressed form for later recall and decompression. Prior to transmission or storage, the interframe coded signal is also typically coded using entropy coder 22. The entropy coder provides still further compression of the video data by mapping the symbols output by the quantizer to variable length codes based on the probability of their occurrence. After entropy coding, the signal output from entropy coder 22 is transmitted along with the compressed motion vectors output from entropy coder 23.

In practice, if a compressed video signal such as the one output from the coder of FIG. 1 is transmitted over unreliable channels (e.g. the internet, local area networks without quality of service (QoS) guarantees, or mobile radio channels), it is particularly vulnerable to transmission errors. Certain transmission errors have the characteristic of lowering the possible maximum throughput (i.e. lowering the channel capacity or "bandwidth") of the transmission medium for a relatively long period of time. Such situations might arise due to a high traffic volume on a store-and-forward network such as the internet, or due to an increasing distance between a transmitter and receiver of a mobile radio channel.

In order to maintain a real-time transmission of the video information in the presence of a reduced bandwidth, the transmitter must reduce the bit rate of the compressed video.

Networks without QoS guarantees often provide messaging channels that allow the receiver or the network to request a lower transmission bit rate from the transmitter. For example, real-time protocol (RTP), designed by the Internet Engineering Task Force and now part of the ITU-T Draft International Standard H.225.0 "Media Stream Packetization and Synchronization on Non-Guaranteed Quality of Service LANs", can be used to "throttle" the transmitter bit rate. For a point-to-point transmission with real-time coding, the video source coder can usually accommodate the request for a reduced bit rate by using a coarser quantization by reducing the spatial resolution of the frames of the video or by periodically dropping video frames altogether. However, if the video has been coded and stored previously, the bit rate is chosen in advance, making such a request difficult to satisfy.

To accommodate the desire for a variable bit rate in the transmission of stored video, a "scalable" video representation is used. The term "scalable" is used herein to refer to the ability of a particular bitstream to be decoded at different bit rates. With scalable video, a suitable part of the bitstream can be extracted and decoded to yield a reconstructed video sequence with a quality lower than what could be obtained by decoding a larger portion of the bitstream. Thus, scalable video supports "graceful degradation" of the picture quality with decreasing bit rate.

In a video-on-demand server, the same original motion video sequence can be coded and stored at a variety of bit rates. When a request for the sequence is made to the server, the appropriate bit rate would be selected, taking into account the current capacity of the network. A problem arises, however, if it becomes necessary to change the bit rate during the transmission. The server may switch from a first bitstream having a first bit rate to a second bitstream having a second bit rate due to a different coarseness of quantization or different spatial resolution. However, if the sequences are interframe coded, the switchover produces annoying artifacts due to the difference in the image quality of the two bitstreams. These can be avoided by the regular use of intraframe coded frames (generally referred to as "I-frames"), in which the entire image is coded, rather than just the differences from the previous frame. The Moving Picture Experts Group (MPEG) standard (i.e. ITU-T H.262) calls for the regular inclusion of I-frames, typically every few hundred milliseconds. However, the use of I-frames, requiring a significant amount of data, dramatically increases the overall bit rate. For example, an I-frame might require six times as much data as an interframe coded frame. In such a case, coding every fifth frame as an I-frame would double the bit rate.

U.S. Pat. No. 5,253,058, to Gharavi, discloses a scalable video architecture which uses a base layer and an enhancement layer (called a contribution layer) which must be encoded by a separate encoder. The method does not support different frame rates for the video at different quality levels but, rather, for different spatial resolutions. More importantly, in this method, the enhancement layer cannot be transmitted and decoded independently; it always requires the transmission and decompression of the base layer first. This makes bandwidth-adaptive serving a complicated task, leads to inefficient compression, and ultimately affects the performance of the whole system.

It is therefore an object of this invention to allow the coding of video sequences for storage and retrieval over networks without QoS guarantees, such that the bit rate provided by the server can be changed during the transmission of the sequence without resorting to the use of I-frames, but while minimizing artifacts produced by the different degrees of quantization used in coding different bitstreams at different bit rates.

SUMMARY OF THE INVENTION

The present invention avoids the aforementioned artifacts by providing a set of transition data that can be interframe decoded between decoding of a first bitstream (at a first bit rate) and a second bitstream (at a second bit rate). The transition data compensates for visual discrepancies between a decoded version of the first bitstream and a decoded version of the second bitstream. Thus, after a first bitstream has been decoded, the transition data is decoded, and then the second bitstream. The second bitstream provides a continuation of the video sequence that was begun with the first bitstream, and the transition data compensates for visual artifacts that would otherwise be present due to the difference in the bit rates of the first and second bitstreams.

In one embodiment of the invention, the transition data is created by periodically imputing the characteristics of a first (typically lower bit rate) bitstream to a second (typically next higher bit rate) bitstream. During interframe coding of the first bitstream, coded data is decoded and employed by the first bitstream coder for use in comparing to data in a subsequent frame, thus allowing the differences between the frames to be determined. The decoded (i.e., reconstructed) video signal has image characteristics due to the relatively coarse quantization used during coding of the first bitstream, or due to a different spatial resolution. This embodiment therefore uses the reconstructed signal as a source from which to periodically code a frame of the second bitstream. That is, while the second bitstream is normally coded directly from the analog video signal, frames of the signal are periodically coded using the signal reconstructed from the first bitstream. In effect, a lower bit rate frame is "inserted" into the higher bit rate data stream. These frames are therefore referred to herein as "lower bit rate insert frames" (LBIFs).

The LBIFs inserted into the second bitstream provide points of correspondence between the image data of the two bitstreams in that the effects of the coarser quantization (or different spatial resolution) of the first bitstream are periodically introduced to the second bitstream. These LBIFs therefore provide points in the temporal progression of the video sequence at which a change from one bitstream to the other may be made, without the introduction of any significant visual artifacts into the decoded video. Thus, when switching from the first bitstream to the second bitstream, it is most desirable to have the first frame received from the second bitstream be a frame that follows an LBIF. Similarly, when switching from the second bitstream to the first bitstream, it is desirable to have the last frame received from the second bitstream be an LBIF. In this way, the two frames will be as closely related as possible.

This embodiment of the invention preferably makes use of LBIFs in a video-on-demand server. Multiple bitstreams are stored to be decoded using different relative bit rates. For all but the bitstream having the lowest bit rate, LBIFs are periodically inserted into the bitstreams from the bitstream having the next lower bit rate. Thus, the server has the same video sequence at different bit rates, with LBIFs to enable switching between the bitstreams. As the server is streaming the video data at one bit rate, a request for a different bit rate (higher or lower) is satisfied by switching to another stored bitstream at the temporal point in the video sequence corresponding to an LBIF in the bitstream having the higher bit rate. Effectively seamless bit rate "throttling" is therefore accomplished with a minimization of artifacts.

In an alternative embodiment, the multiple bitstreams are transmitted simultaneously over a transmission medium, such as the airwaves. The bitstreams are multiplexed together, and demultiplexed at the site of a decoder. With all of the bitstreams being available at the decoder location, the switching from one bitstream to the next is accomplished in the manner described above, only by switching between the received, demultiplexed bitstreams. Preferably, each frame of each bitstream is accompanied by coded data regarding the nature of the frame (i.e. whether it is a frame after which one may switch to a next higher bit rate bitstream, a next lower bit rate bitstream, or not at all).

In another alternative embodiment, the input video signal is periodically coded in intraframe mode, such that frames of data are generated which correspond to interframe coded frames of the lowest rate bitstream, but which include all of the data necessary to independently recreate that frame of the video sequence. This embodiment does not have the high level of data compression of the preferred embodiment, but allows for random access. LBIFs are used in the higher rate bitstreams as points at which one may switch between the bitstreams with a minimum of quantization-based artifacts. However, the intraframe coded frames allow a user to begin the video sequence at any of the temporal points corresponding to the location of the intraframe coded frames. If a higher bit rate is thereafter desired, the rate may be increased at the appropriate LBIF locations, as described above. This embodiment is also useful in that it allows for fast forward and fast rewind of the video sequence by displaying the intraframe coded frames only, thus allowing a user to search quickly through the video sequence.

In yet another embodiment of the invention, LBIFs are not inserted into the existing bitstreams. Instead, at least one (and typically a plurality of) "switch" frames are created. That is, transition data is stored on the server separate from the bitstreams containing the video data, and is used to provide an interframe decoding system with data that compensates for the difference in reconstructed frames of the two bitstreams. This compensation is typically for a given frame of video data at any point in time, each switch frame (or "S-frame") therefore providing a point of continuity between the bitstreams only for that frame. The S-frame is preferably the difference between the two bitstreams for similar frames. Since a given frame represents a "time index" (a specific temporal point in the video sequence), any difference between frames that are reconstructed for a given time index from the first and second bitstream comes from the different bit rates (e.g., a difference in quantization levels or spatial resolution). Thus, taking the difference between reconstructed frames of the same time index (or consecutive time indexes) for the two bitstreams provides the information necessary to compensate the decoder for bitstream transition related artifacts.

In one version of the S-frame embodiment, the S-frames do not have a common time index with a frame from each of the higher and lower bitstreams, and the coding of the difference between reconstructed frames in enhanced by motion compensation. Thus, the direction of transition (e.g., from the higher bit rate bitstream to the lower bit rate bitstream) determines which difference must be taken. That is, since the lower bit rate and upper bit rate frames used to construct the S-frame are from consecutive (not simultaneous) time indexes, it is necessary to subtract the motion compensated frame having the earlier time index from the frame having the later time index to generate the right S-frame. Therefore, if the S-frame is intended to create a point at which the decoding may change from the lower bit rate bitstream to the higher bit rate bitstream, the S-frame is generated by subtracting a motion compensated lower bit rate frame (having an earlier time index) from a higher bit rate frame (having a later time index).

If the S-frame is generated using frames from the lower bit rate bitstream and the higher bit rate bitstream that have the identical time index, a two-directional point of continuity is created between the bitstreams by the S-frame. In that case, motion compensation is omitted, and a single S-frame can be used to transition from either the lower bit rate bitstream to the higher bit rate bitstream, or vice versa. In such an embodiment, the transmitted S-frame has the same time index as the last frame of the first bitstream, and is transmitted before a first frame of the second bitstream, which typically has a subsequent time index. If the S-frame was created by subtracting a frame of the first bitstream from a frame of the second bitstream, it may be processed directly by the decoder. However, for an S-frame used to switch from the second bitstream to the first bitstream, the frame is first inverted by the decoder before being added. This ensures that the correct compensation is being provided by the S-frame.

DETAILED DESCRIPTION

Figure 1:
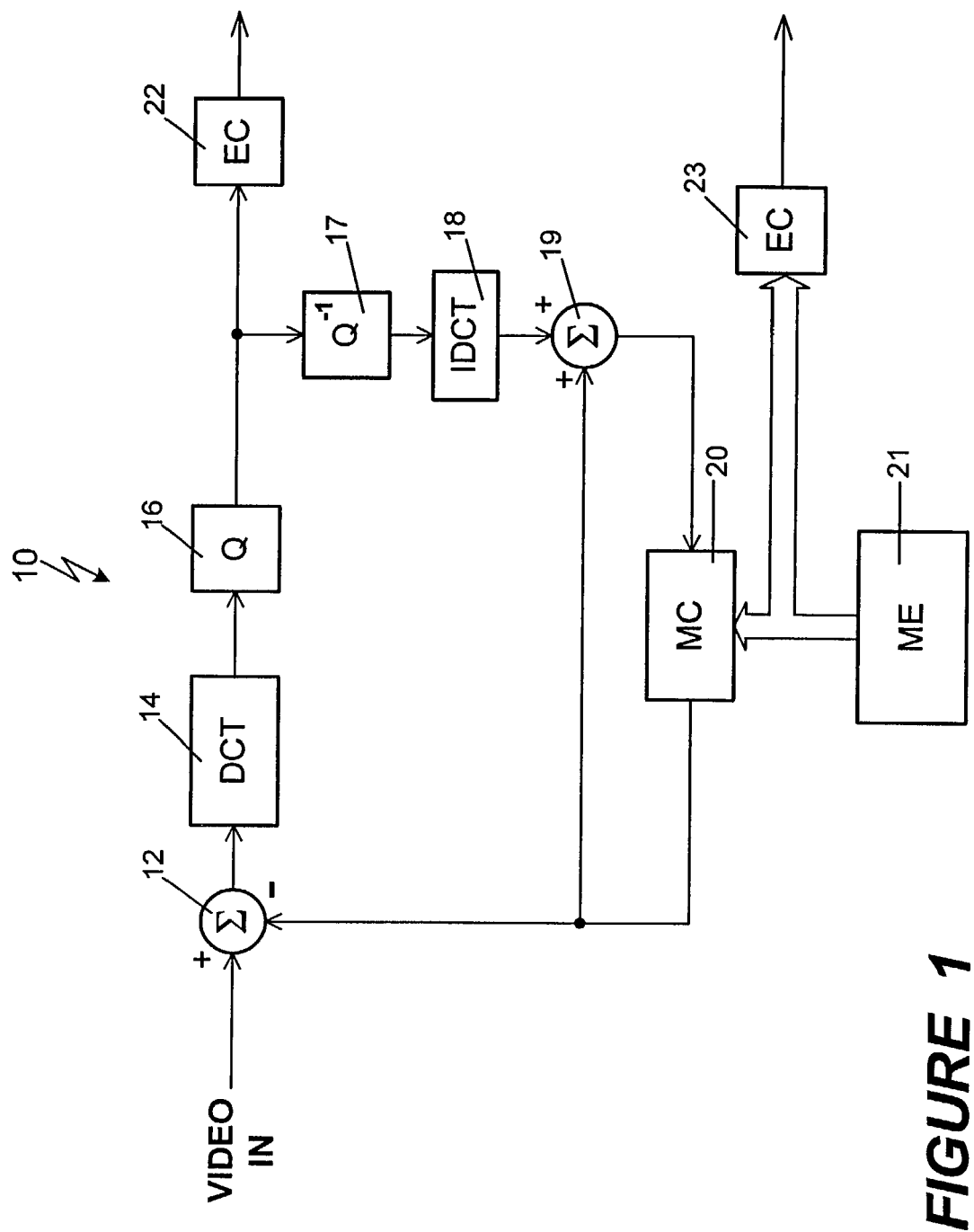
FIG. 1 is a schematic view of a prior art interframe coding apparatus.
Figure 2:
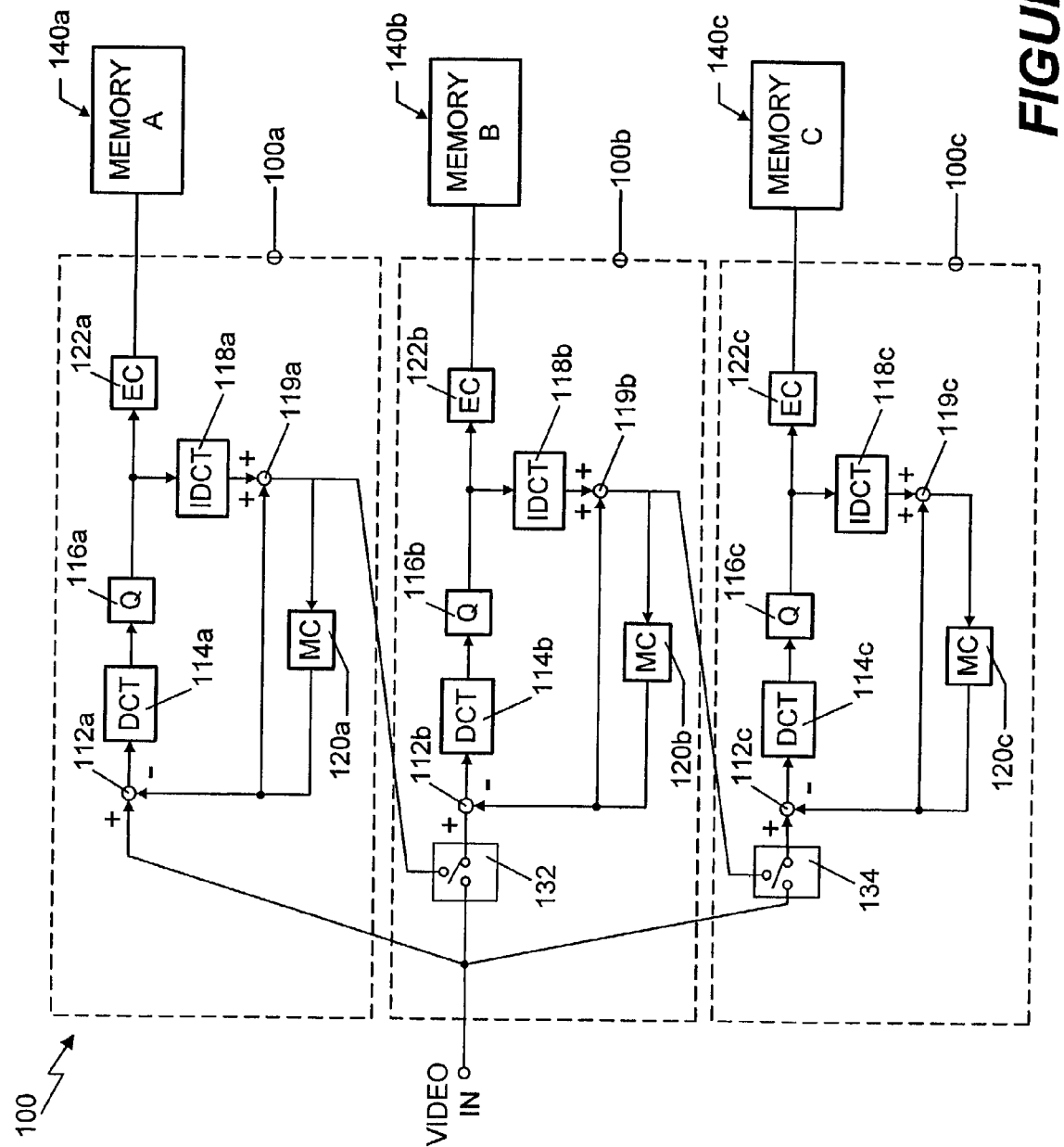
FIG. 2 is a schematic view of a scalable interframe coding apparatus according to the present invention.

An interframe coding apparatus 100 according to the present invention is shown schematically in FIG. 2. The coding apparatus 100 contains three embedded coders 100a, 100b and 100c, each of which supplies data at a different bit rate. It will be recognized by those skilled in the art that the coding apparatus 100 may consist of any plural number of embedded coders, so as to allow the support of any desired number of different bit rates. It will also be understood that the coders 100a, 100b, 100c may be any type of interframe coder, and still make use of the inventive principles described herein. The preferred embodiment for each of the embedded coders 100a, 100b, 100c, however, are of essentially the same structure as the prior art coder of FIG. 1. Some of the more important details of the coders are discussed briefly above in conjunction with FIG. 1.

The coding apparatus 100 of FIG. 2 is arranged to allow the coding and storage of the same video signal at a variety of different bit rates. In particular, the video signal is coded using different resolutions of quantization in each of coders 100a, 100b, 100c, respectively. As shown, the output of coder 100a is stored in memory unit 140a, the output of coder 100b is stored in memory unit 140b, and the output of coder 100c is stored in memory unit 140c. Once the video signal is coded and stored, the stored signals may be used as part of a video-on-demand server to provide the same video signal at any of a number of different bit rates. The manner in which the data is coded and stored allows for the bit rate to be changed during a transmission of the video signal by switching the output from, for example, memory 140a to memory 140b.

Multiple coders 100a, 100b, 100c are each designed for coding data with a different level of compression, so that each provides video data for transmission at a different bit rate. In general, the greater the number of quantization levels used by the coder, the higher the quality of the transmitted image, and the higher the bit rate. Thus, in the tradeoff between image quality and transmission bandwidth, the quality of a transmission channel often determines the bandwidth which will allow real time decoding and display at the receiving end of the transmission. If a variety of bit rates are available, handshaking commands between the destination and the source can be used to select the highest bit rate tolerable by the transmission channel (for real time decoding), thereby providing the best possible image quality.

In the FIG. 2 embodiment, coder 100a codes the video signal with a coarseness of quantization which results in its output having the lowest bit rate of the signals provided by the coders. Similarly, the signal output by coder 100b has a less coarse quantization which produces the next higher bit rate, and the signal output by coder 100c has an even less coarse quantization than coder 100b, which results in the highest bit rate. Thus, if a transmission channel being used allows only a low bit rate, the decoder sends a request for the coded version of the video signal having the lowest bit rate (i.e. the signal coded by coder 100a).

Figure 3:
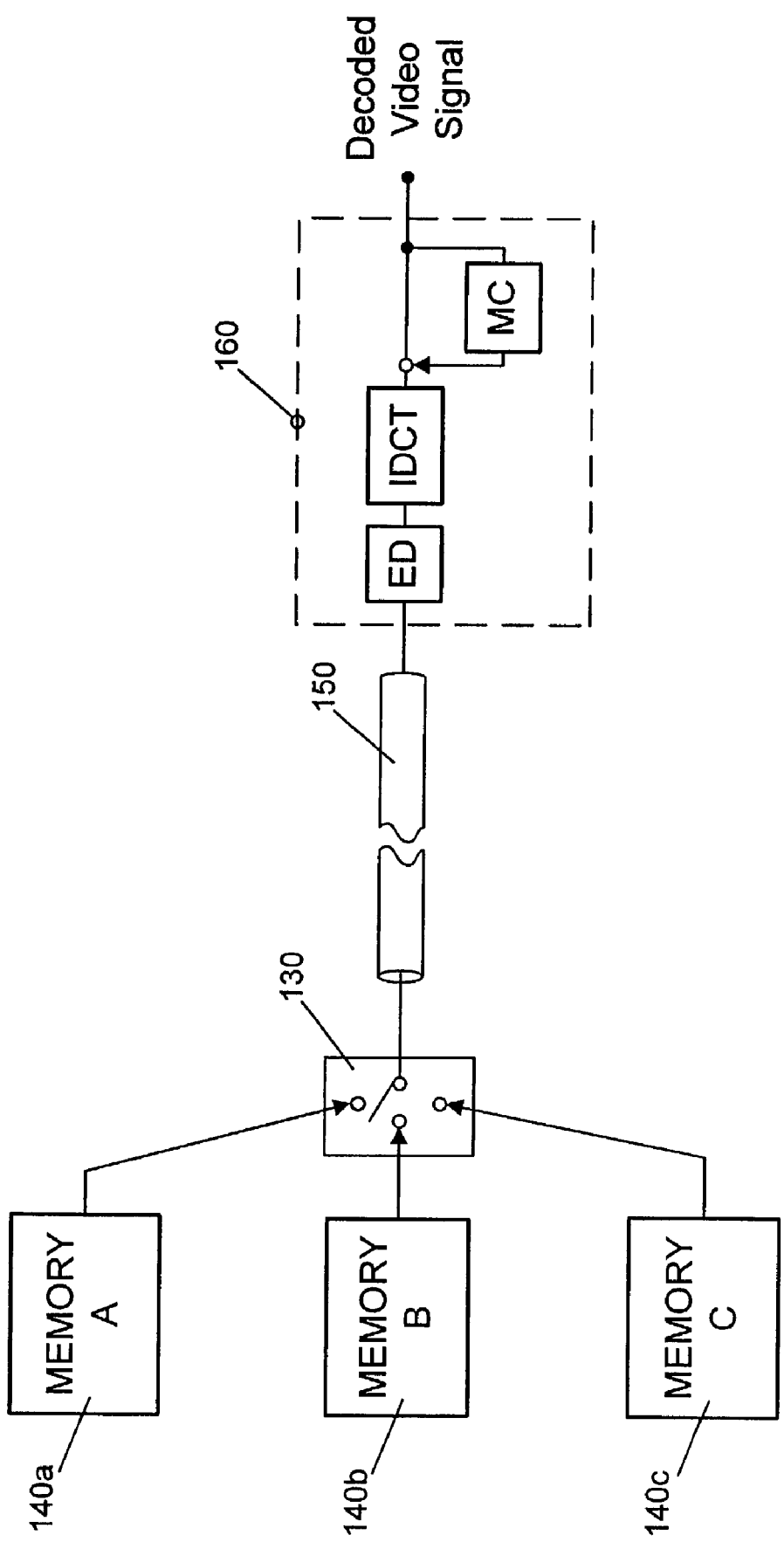
FIG. 3 is a schematic view of a video-on-demand server apparatus according to the present invention.

After the three bitstreams have been coded by coders 100a, 100b, 100c and stored in memory units 140a, 140b, and 140c, respectively, they may be arranged as part of a video-on-demand server, depicted schematically in FIG. 3. The server provides motion video over a transmission channel 150 in response to a request from a destination site, at which is located decoder 160. The decoder shown in FIG. 3 may include an entropy decoder (ED), an inverse DCT (IDCT) and appropriate motion compensation (MC) elements. A selector (depicted as single-pole, triple-throw switch 130) directs the bitstream from one of memory units 140a, 140b, 140c to channel 150 depending on the capacity of the channel 150. Those skilled in the art will recognize that the switch 130 of FIG. 3 is primarily for illustrative purposes, and that selection between the different coder outputs will likely not use an electrical switch in the conventional sense, but rather one of many well-known means of selecting from a number of different data sources.

The capacity of transmission channel 150 is determined through handshaking communication between the destination site containing decoder 160 and the server containing memory units 140a, 140b, 140c. Once the highest possible bit rate is determined, the selector 130 directs the output bitstream from the appropriate memory unit to the receiver over the transmission channel. If the lowest bit rate was determined to be the highest that could be tolerated by the channel 150, the switch 130 would be in its uppermost position (relative to the orientation of FIG. 3), such as to direct the bitstream from memory 140a to the channel 150. However, the destination site containing decoder 160 might also be capable of tolerating a signal having a higher bit rate, such as that output by memory unit 140b or memory unit 140c. In such a case, the switch 130 would be positioned in either its middle position or its lowest position (relative to the orientation of FIG. 3) such as to provide signal connection between the transmission channel 150 and the desired source (either memory 140b or memory 140c, depending on the maximum tolerable bit rate).

If the bit rate tolerable by a particular receiver is unchanged for the duration of the transmitted video signal, then the entire video sequence is transmitted from the same memory unit, and there is no break in the continuity of the interframe coded transmission. Should the tolerable bit rate change during the transmission of the video sequence (either increasing or decreasing) it is often desirable to change from one bit rate to another. However, using interframe coding (i.e. without the periodic insertion of I-frames), to simply change from the bitstream of one memory unit to the bitstream of another (i.e. at the same temporal point in the video sequence), introduces artifacts due to the differences in the coarseness of quantization used by the coders which generated the stored bitstreams. To avoid these artifacts, the present invention provides points of continuity between bitstreams of different bit rates by periodically using reconstructed frames from one bitstream as the source for coding another, thereby providing a sufficiently similar point of reference at which switching between the two bitstreams may occur during playback.

Referring again to FIG. 2, the coding by coders 100a, 100b, 100c is entirely interframe coding, without the periodic insertion of I-frames. This omission of I-frames significantly reduces the data overhead, allowing many more frames per unit time for a given coarseness of quantization. The manner in which the present invention accommodates changes between multiple bitstreams having different bit rates without the occurrence of artifacts is described in more detail below.

In the coding apparatus of FIG. 2, one frame of reconstructed data from coder 100a is periodically inserted into the input data stream of coder 100b. This capacity for frame insertion is shown in FIG. 2 by single-pole, double-throw switch 132. As with the switch 130, switch 132 is shown using electrical switch symbology, but will most likely be embodied by a solid state switching means or some other well-known means of selecting from different data sources. However, for ease of description, the operation of switch 132 will be described in terms of an electrical switch configuration.

While the switch 132 is normally in the position which allows signal connection between the input video signal and summing node 112b, switching of the switch 132 to receive the output of summing node 119a of coder 100a results in the insertion of data from coder 100a into the input data stream of coder 100b. This is data which has been coded with a coarser quantizer 116a, reconstructed by inverse DCT 118a and added to the motion compensated prediction signal at summing node 119a. Therefore, the quantization errors introduced by quantizer 116a are present in the reconstructed signal at the output of the inverse DCT 118a, just as they would be at a decoder which was receiving a signal coded by coder 100a.

The amount of reconstructed data which is inserted from coder 100a to coder 100b corresponds to a single frame of the video sequence. Since this frame includes the quantization error attributable to the output of coder 100a, it is representative of a video frame which would be output by a decoder which had been receiving the output signal of coder 100a. By inserting such a frame into the frame sequence of coder 100b, the interframe coded signal of coder 100b acquires the equivalent of the quantization error of coder 100a. Thus, when an interframe coded frame from coder 100b that was based on the reconstructed frame from coder 100a is decoded at decoder 160, that decoded frame will contain the quantization error of a decoded signal which was received from coder 100a. Because the insertion of a reconstructed frame is always from a lower bit rate coder to a next highest bit rate coder, these frames are referred to herein as "lower bit rate insert frames" (LBIFs).

The insertion of an LBIF from coder 100b to coder 100c is essentially the same as the insertion of an LBIF from coder 100a to 100b. A reconstructed frame from summing node 119b is input to coder 100c by moving switch 134 to the position in which it provides signal connection between summing node 119b and summing node 112c. After interframe coding using the reconstructed frame from summing node 119b (i.e. inserting the LBIF), the switch is moved back to its normal position in which it receives the input analog video signal. The switch 134 is thereafter periodically moved so as to insert subsequent LBIFs into the video signal input to coder 100c. Thus, the bitstream stored in memory unit 140c consists of a signal coded at the highest bit rate, with the signal source being the original video input with the periodic insertion of LBIFs.

In the preferred embodiment of the invention, the use of LBIFs significantly reduces the formation of artifacts due to the switching from the signal coded using one coder (having one coarseness of quantization) to the signal coded using a second coder (having a different coarseness of quantization), if the switching is done at the appropriate time. The bitstream stored in the memory units 140b, 140c contain compressed LBIFs inserted from coders 100a and 100b, respectively. Thus, the LBIFs will be read out of the memory units in the appropriate part of the bitstreams along with the other image data. This is better understood using the following example.

Referring to FIG. 3, if a video sequence was being transmitted over transmission channel 150 using the output of memory unit 140b, a medium quality image would be received by the decoder 160, due to the coarseness of quantization applied to the stored bitstream by quantizer 116b (FIG. 2). If the effective bandwidth of the transmission channel then decreased, decoder 160 would send a request for transmission at a lower bit rate. This would enable the decoder to continue to receive a real time video sequence, albeit at a lower image quality. To process this request, switch 130 changes the signal output on transmission channel 150 from that of memory 140b to that of memory 140a, but does so immediately following transmission of one of the inserted LBIF frames in the data stream of memory 140b. That is, the switching from memory unit 140b to memory unit 140a is done when the last data output by memory unit 140b is an interframe coded frame which was based on an LBIF introduced from coder 100a, rather than a frame from the video input signal. As a result, the last frame of data which is received by decoder 160 from memory unit 140b includes the quantization error imputed from coder 100a. Since the next frame data received by decoder 160 is from memory unit 140a, and has the same degree of quantization error, artifacts due to the different coarseness of quantization applied by coders 100a and 100b are minimized in the decoded signal.

The LBIFs stored in the bitstreams of the present invention are also preferably used for switching from a lower bit rate to a higher bit rate. For example, if decoder 160 was receiving data from memory unit 140a, and additional bandwidth on transmission channel 150 became available, a request could be issued for the transmission of higher quality image data. The video server would respond by changing switch 130 to the position in which it contacts the output of memory unit 140b. However, in the preferred embodiment of the invention, the switching occurs in such a manner that the first frame received from the bitstream of memory unit 140b is one coded with reference to a previous frame, which was an LBIF. The frame following the LBIF has been coded using a very similar reconstructed previous frame to that stored in the motion compensating predictor of the decoder from its decoding of the bitstream from memory 140a. Thus, artifacts which would normally be generated due to switching from a lower bit rate to a higher bit rate are avoided.

Figure 4:
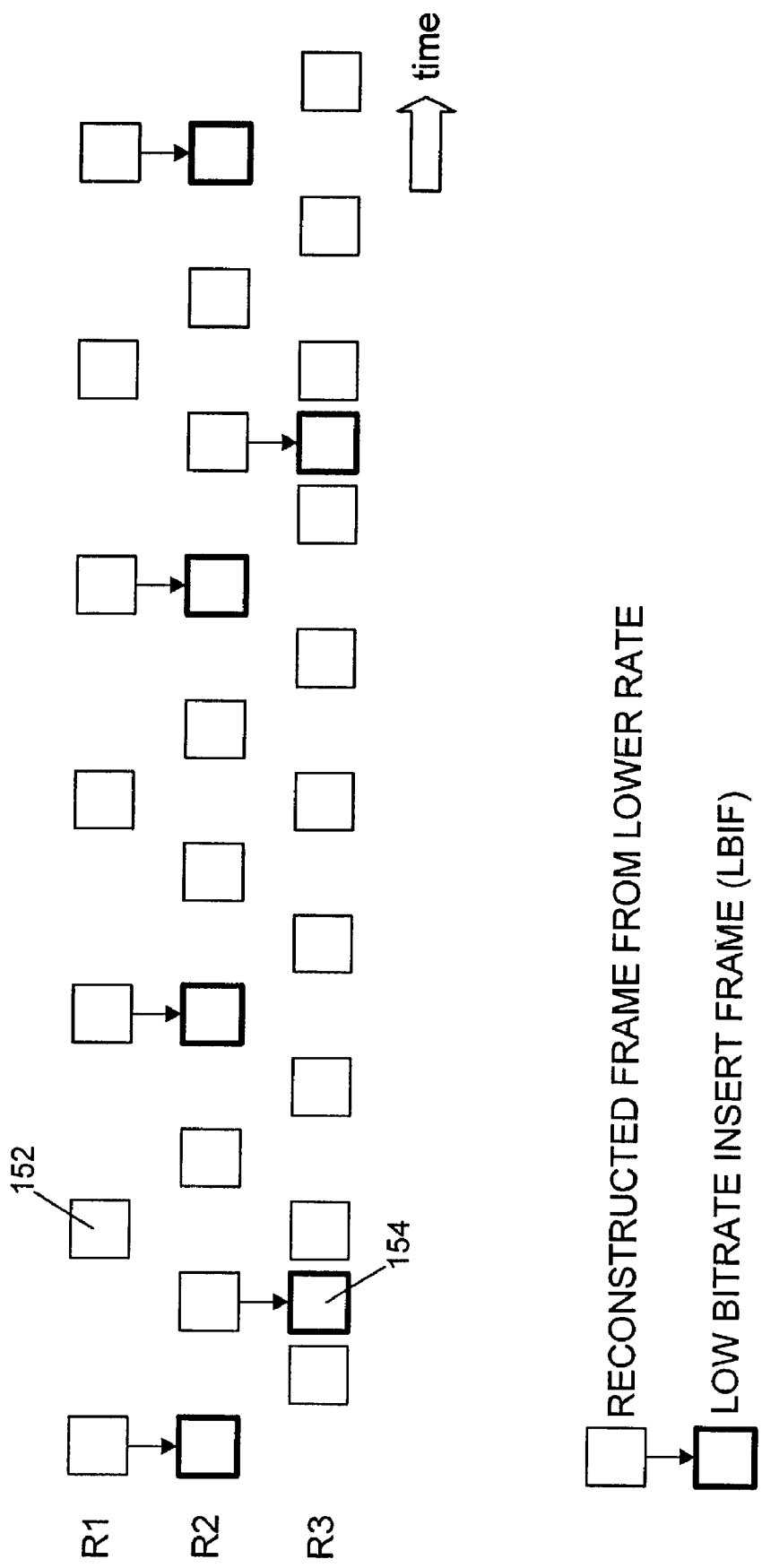
FIG. 4 is a diagrammatic view of three bitstreams that are decoded using a lower bit rate insert frame architecture according to the present invention.

FIG. 4 is a schematic illustration of the three bitstreams stored, respectively, in memory units 140a, 140b and 140c. The three bitstreams are labeled RI (corresponding to the bitstream stored in memory unit 140a), R2 (corresponding to the bitstream stored in memory unit 140b), and R3

(corresponding to the bitstream stored in memory unit 140c). The bitstreams are shown as sequences of frames which progress in a horizontal direction indicative of time. The standard frames 152 have a lighter outline, while the LBIF frames 154 are in bold. Of course, the frames 152, 154 actually represent the interframe coded data describing the difference between the current frame of the input signal and the previous reconstructed frame (the standard frames being coded from the video signal and the LBIF frames being coded from the LBIF). However, for the purposes of description, they are more easily represented in the manner shown.

The bitstreams R2 and R1 of FIG. 4 have coarser quantization than that of bitstream R3. In addition, they may also have lower frame rates. That is, R1 uses coarser quantization and (typically) a lower frame rate than bitstream R2 which, in turn, uses coarser quantization and (typically) a lower frame rate than bitstream R3. The arrows between frames in FIG. 4 show the points at which a reconstructed frame from a bitstream is inserted as an LBIF into the bitstream with the next highest bit rate. The LBIFs can be inserted so as to replace what would otherwise be standard frames in the higher bit rate bitstream, as demonstrated by the insertions depicted in FIG. 4 from bitstream R1 to bitstream R2, or the LBIFs can be inserted in between existing standard frames of the higher bit rate bitstream, as demonstrated by the insertions depicted in FIG. 4 from bitstream R2 to bitstream R3. In either case, the quantization error of the lower rate bitstream is introduced into the higher bit rate bitstream.

In the preferred embodiment, LBIFs are inserted from one bitstream to the bitstream having the next higher bit rate. Thus, bitstream R1 (having the lowest bit rate) does not contain any LBIFs. In order to get the best correspondence between the decoded signals when switching from one bitstream to another, the switching is preferably done at a point in the video sequence which corresponds to an LBIF in the higher of the two bitstreams. That is, if one is switching from a lower bit rate to a higher bit rate, the switching should be timed such that the first frame received from the higher rate bitstream corresponds to a frame following an LBIF. If one is switching from a higher bit rate to a lower bit rate, the switching should be timed such that the last frame transmitted from the higher rate bitstream corresponds to an LBIF.

Figure 5:
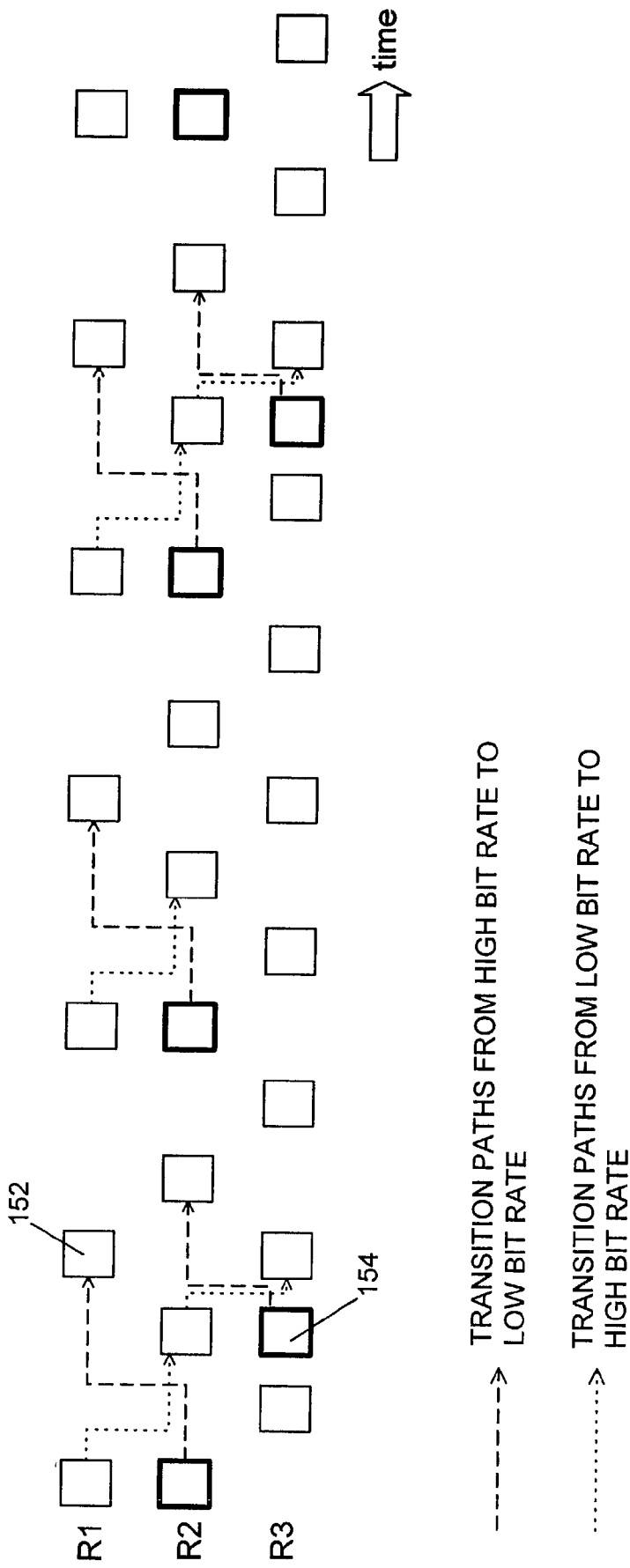
FIG. 5 is a diagrammatic view of three bitstreams that are decoded using a lower bit rate insert frame architecture of the present invention and showing transition paths for switching between the bitstreams.

Using the switching criteria mentioned above, the available switching paths from one bitstream to another are shown schematically in FIG. 5. As in FIG. 4, the frames depicted in FIG. 5 are both standard frames (in lighter outline) and LBIF frames (in bold outline). To demonstrate the switching paths of the preferred embodiment, the paths from a higher bit rate bitstream to a lower bit rate bitstream are depicted as dashed lines, while the paths from a lower bit rate bitstream to a higher bit rate bitstream are depicted as dotted lines. As shown, the switching from a higher bit rate to a lower bit rate proceeds from an LBIF frame in the higher bit rate bitstream to a non-LBIF frame in the lower bit rate bitstream. Similarly, switching from a lower bit rate to a higher bit rate proceeds from a non-LBIF frame in the lower bit rate bitstream to a frame following an LBIF frame in the higher bit rate bitstream. Switching in this manner provides the best correspondence between the image characteristics of the two bitstreams at the time of switching.

Figure 6A:
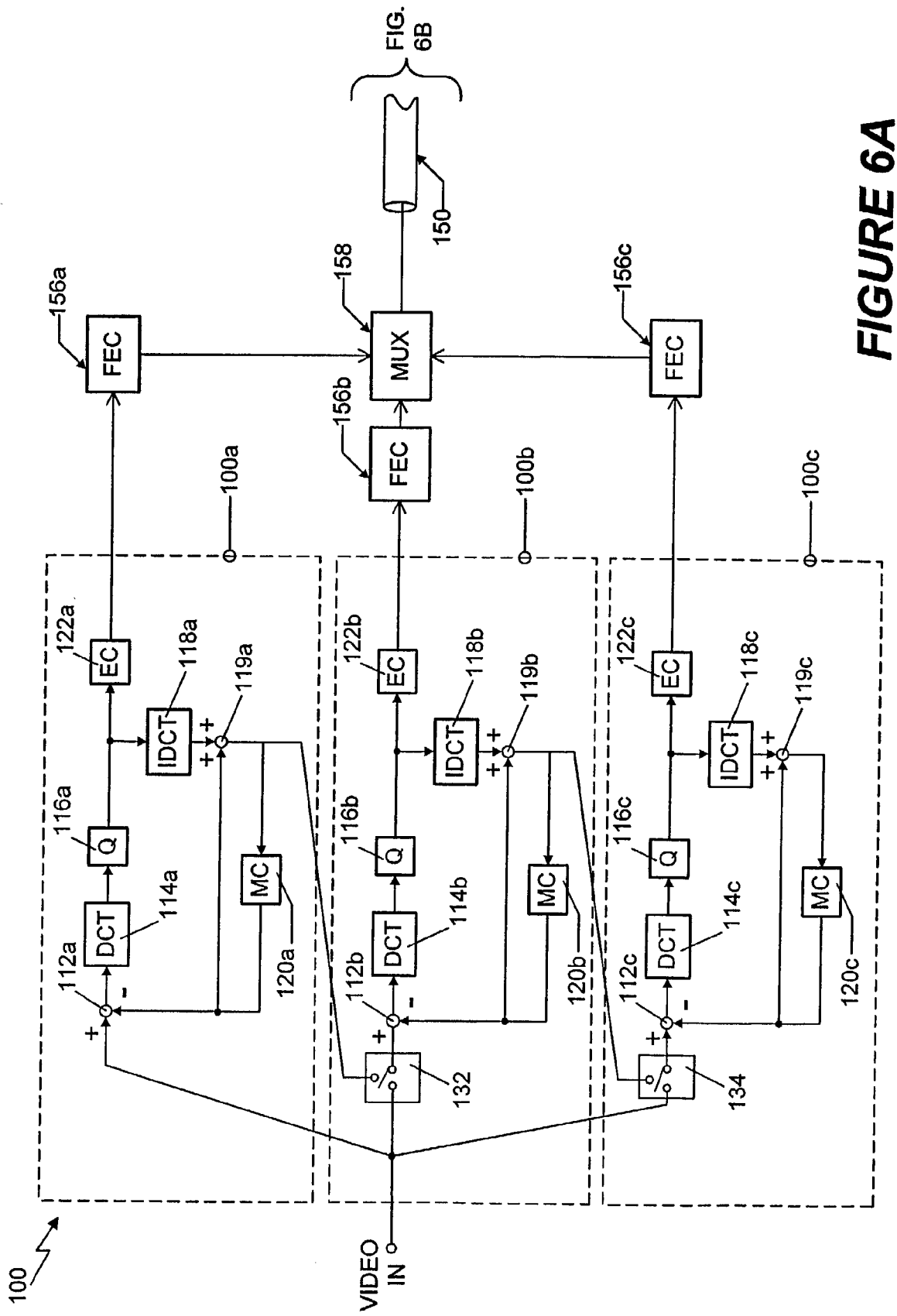
FIG. 6A is a schematic view of the coding portion of an alternative embodiment of the present invention in which multiple bitstreams are transmitted over a broadband transmission channel.
Figure 6B:
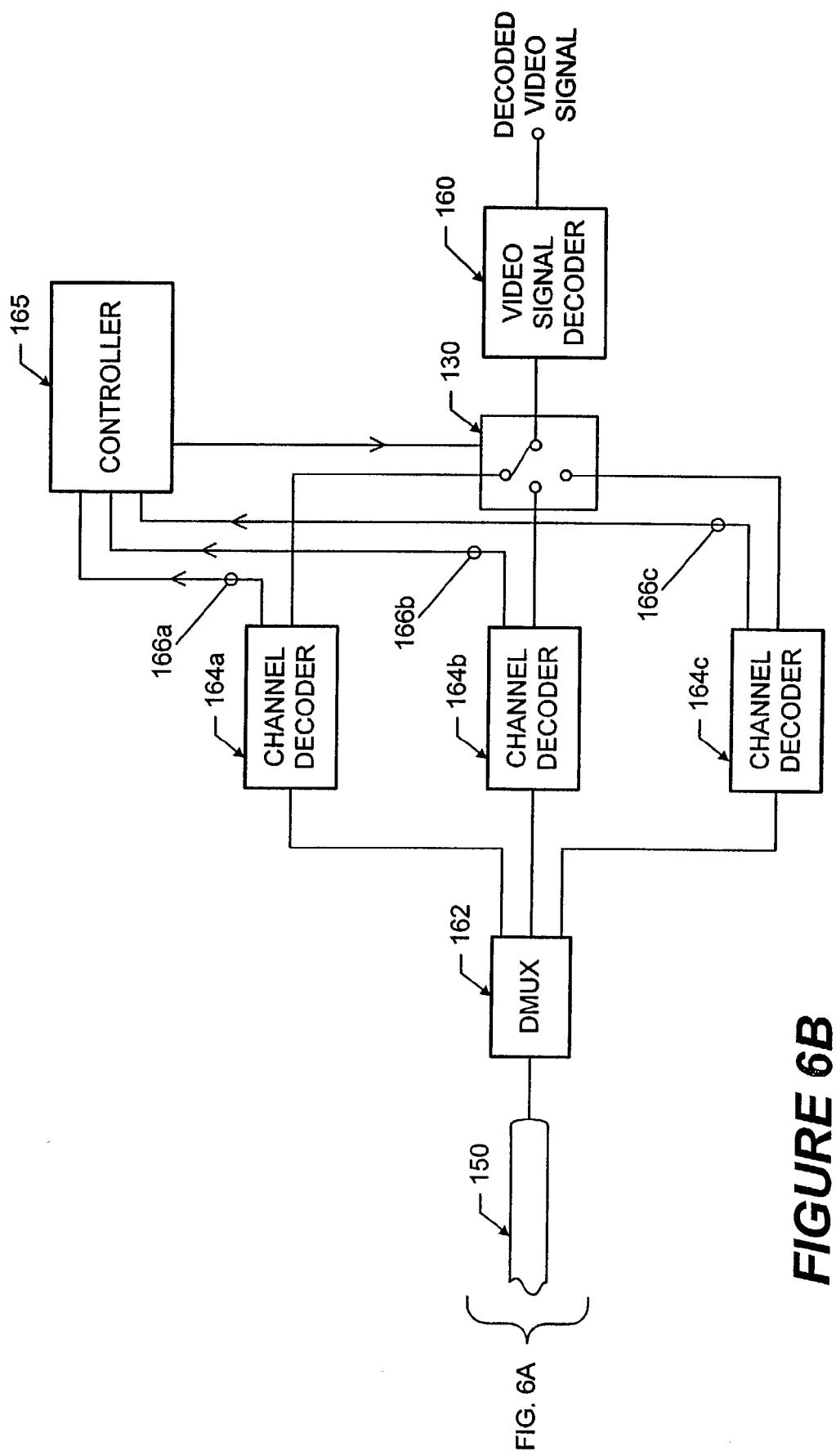
FIG. 6B is a schematic view of the decoding portion of the alternative embodiment shown in FIG. 6A.

Shown in FIGS. 6A–6B is an alternative embodiment of the invention in which multiple bitstreams having different bit rates are transmitted simultaneously over a transmission channel 150. In this embodiment, the channel 150 is a medium such as the airwaves, or optical or electrical cables. The bandwidth of the channel 150 is sufficient to carry all of the bitstreams simultaneously to allow selection at the receiver end of the transmission.

The coders 100a, 100b, 100c shown in FIG. 6A are identical to those shown in FIG. 2, and produce the same multiple bitstreams with LBIFs inserted into the bitstreams of coders 100b and 100c. In this embodiment, forward error correction (FEC) 156a, 156b, 156c is preferably employed with each of the coders 100a, 100b, 100c, respectively. Forward error correction (also commonly referred to as "channel encoding") is known in the art, and applies an error-correcting code to the signals output by the coders, which allows signals detected as being in error to be automatically corrected at the receiving end of the transmission channel 150. The signals output from FECs 156a, 156b, 156c are input to multiplexer 158, where they are multiplexed into a signal output on transmission channel 150.

Referring to FIG. 6B, the signals broadcast over transmission channel 150 are received by demultiplexer 162, and separated back into the three bitstreams coded by the FECs 156a, 156b, 156c. Each of these bitstreams is then directed, respectively, into a channel decoder 164a, 164b, 164c, which decodes the signals for the FEC coding, and corrects for identifiable transmission errors. Each channel decoder is also equipped with a "can't correct" flag, which is asserted on the appropriate one of outputs 166a, 166b, 166c when transmission errors are uncorrectable by the channel decoder. The outputs 166a. 166b, 166c of channel decoders 164a, 164b, 164c are connected to a controller 165 which detects the flags and responds to the uncorrectable errors in some predetermined way, such as by changing the bitstream being forwarded to signal decoder 160.

The signals output from channel decoders 164a, 164b, 164c are input to bitstream selector 130, which functions in the same manner as the selection means 130 shown in FIG. 3. Channel decoder 164a receives the lowest rate bitstream (i.e. that originating in coder 100a), and when the selector 130 is positioned so as to make signal connection between channel decoder 164a and video signal decoder 160, that bitstream is decoded in video signal decoder 160, and the decoded video signal output is a reconstruction from the lowest bit rate signal transmission. Similarly, when the selector is in either of its other two signal connection positions, the corresponding signal from channel decoder 164b or 164c (having originated in coder 100b and coder 100c, respectively) is directed to video signal decoder 160. In the preferred embodiment, video signal decoder 160 is identical to video signal decoder 160 of FIG. 3, decoding and decompressing the selected video signal.

FEC unit 156a provides more error protection than FEC unit 156b, which in turn provides more error protection than FEC unit 156c. Thus, if the transmission channel is degraded and a higher transmission bit error rate results, the channel decoder 164c for the highest bit rate might no longer be able to reliably correct the bit errors introduced by the transmission channel, while channel decoders 164b and 164a still perform error correction successfully. In such a case, this condition is signalled to the controller 165, which repositions switch 130 to direct the corrected bitstream at the output of channel decoder 164b to the video signal decoder 160. This switching occurs after the successful decoding of an LBIF by channel decoder 164c. In case of further channel degradation, such that the output of channel decoder 164b has become too unreliable, controller 165 repositions switch 130 to select the output of channel decoder 164a. If channel conditions improve, as indicated by the flags on outputs 166a, 166b, and 166c, controller 165 can then switch the source of the signal being decoded back to a higher rate bitstream with less error protection.

Figure 7:
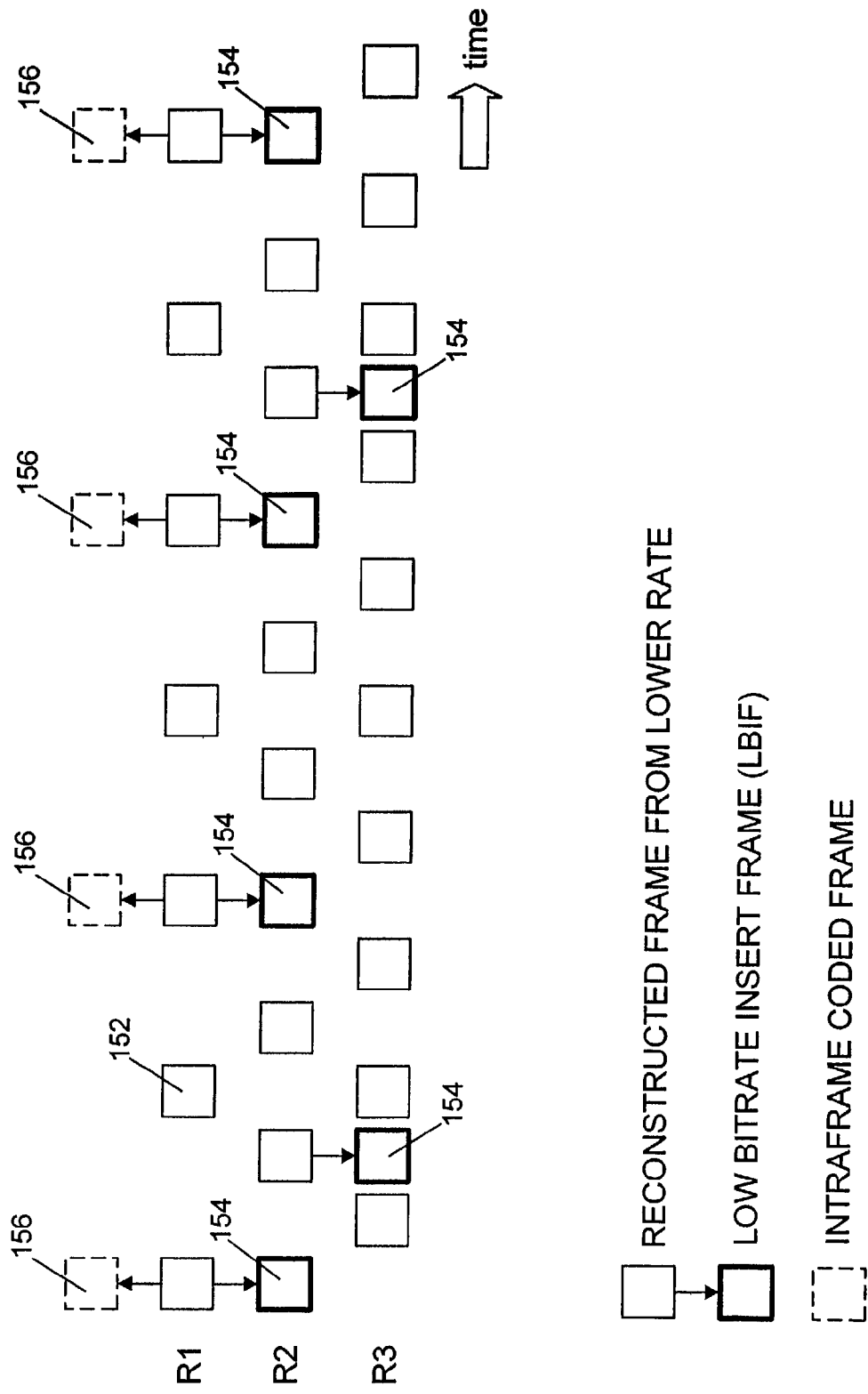
FIG. 7 is a diagrammatic view of three bitstreams generated using an alternative embodiment of the invention in which intraframe coded frames of the input video signal are periodically generated.

In another variation of the invention, the LBIF architecture is used in a manner which supports random access, fast forward and fast reverse video with visible picture. The frame coding scheme for the stored, compressed video embodiment is shown in FIG. 7. Since interframe coded video frames do not allow for random access, in this embodiment the input video signal is periodically coded in intraframe mode as well as in interframe mode. That is, periodically, a frame of the reconstructed video signal, as it occurs at the output of summing node 119a (FIG. 2), is used to continue the interframe coding, but is also used to generate an intraframe coded version of the frame, (i.e., one with no reliance on previously transmitted image data). Alternatively, the output of summing node 119b or 119c could also be used to generate the desired intraframe coded frames. The intraframe coded frames 156 are shown in dashed lines in FIG. 7, and provide a bitstream (of relatively infrequent frames) along which video transmission may randomly begin.

In a multiple bitstream video server application, the FIG. 7 embodiment allows for random access at any of the desired bit rates, while requiring the use of intraframe coding only for infrequent frames. Since the use of LBIFs in the higher rate bitstreams allows the change from one bitstream to another without the formation of artifacts, random access in one of the higher bit rate bitstreams is accomplished by starting the video sequence at one of the intraframe coded frames 156, and then changing to higher rate bitstreams at the LBIFs 154, as in the embodiment of FIGS. 2–5. The data provided by the intraframe coded frame provides the necessary information to continue using interframe coding.

In addition to allowing random access viewing, the FIG. 7 embodiment allows for fast forward and reverse scanning of the video sequence. By decoding only the intraframe coded frames 156 (i.e. skipping all of the interframe coded data), the video sequence may be viewed at a high speed. This viewing may be in either a forward or a reverse direction, depending on how the data is read out of the video server.

Figure 8:
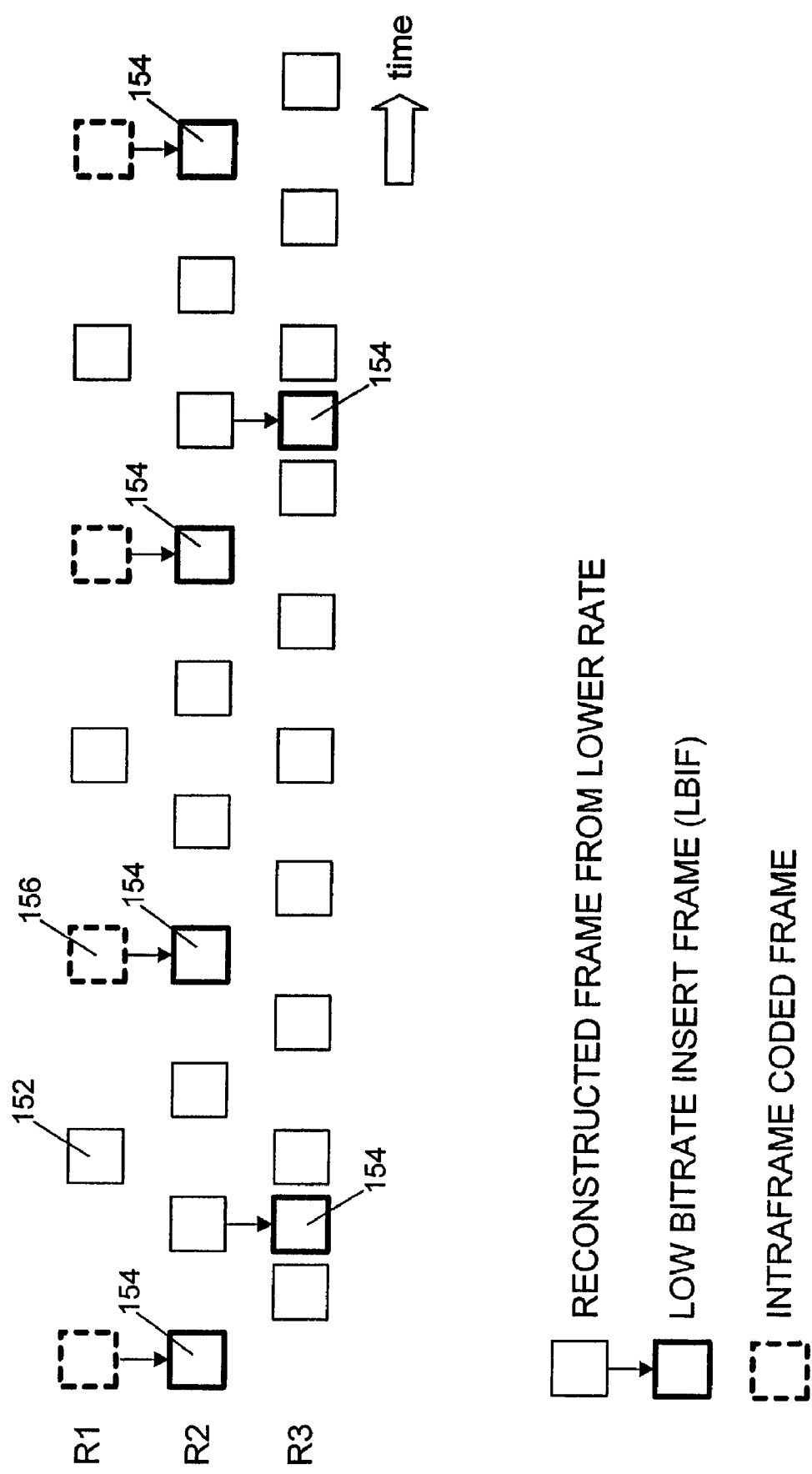
FIG. 8 is a diagrammatic view of three bitstreams generated using an alternative embodiment of the invention in which multiple bitstreams are transmitted over a broadband transmission channel, and in which intraframe coded frames of the input video signal are generated and used to periodically replace an interframe coded frame of a low bit rate bitstream.

The coding scheme for a variation of the FIG. 7 embodiment is shown in FIG. 8. The embodiment of FIG. 8 is intended for use with a broadcasting embodiment such as that of FIGS. 6A–6B. Similar to FIG. 7, intraframe coded frames are used, but for the embodiment of FIG. 8, the intraframe coded frames are periodically inserted into the lowest rate bitstream R1. Like the embodiment of FIG. 7, that of FIG. 8 allows random access by having the first decoded frame be an intraframe coded frame 156. If a higher bit rate is desired, switching to the higher rate bitstreams R2 and R3 makes use of the LBIFs in the same manner as described in conjunction with FIGS. 2–5. Furthermore, fast forward and reverse functions are also available using only the intra-frame coded frames in the same manner as described above in conjunction with FIG. 7.

Figure 9:
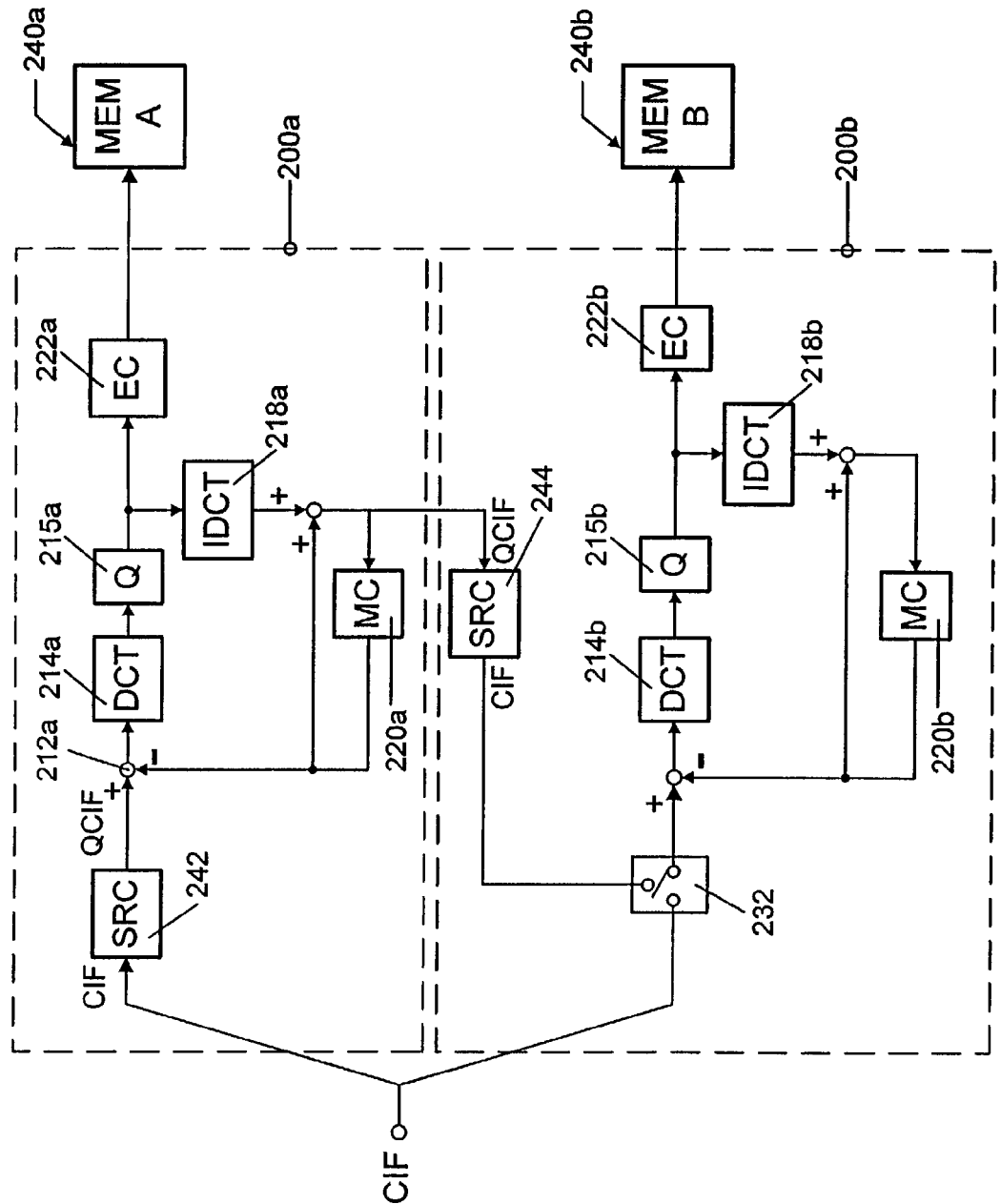
FIG. 9 is a schematic view of a scalable interframe coding apparatus similar to that of FIG. 2, but which makes use of reference picture resampling elements.

Another embodiment of the invention is shown in FIG. 9, in which a coding mechanism is shown that is similar to that of FIG. 2. The coder of FIG. 9 differs from the coder of FIG. 2 in that it supports different bit rates resulting from different "spatial resolutions," rather than from simply differing quantization levels (which affect the noise level, or "signal-to-noise" resolution). In this embodiment, the LBIF coding also makes use of "spatial resolution conversion" (SRC), which is discussed in more detail below. The preferred embodiment of the invention makes use of "reference picture resampling," which is a particular implementation of SRC supported by ITU-T Recommendation H.263. Another difference between FIG. 9 and FIG. 2 is that while the coder of FIG. 2 is shown coding at three different bit rates, the coder of FIG. 9 is shown coding at only two. This is for ease of description only, and those skilled in the art will recognize that the principles of the coder of FIG. 9 could be extended to as many different bit rates as desired.

SRC is known in the art, and will not be described in any detail herein. In short, SRC allows changing from a low spatial resolution to a high spatial resolution and vice versa by subsampling or interpolation techniques. For example, the different coding resolutions in FIG. 9 correspond to a "common intermediate format" (CIF) and a "quarter common intermediate format" (QCIF). These terms refer to conventional formats, both having a temporal resolution of 30 frames-per-second, but different spatial resolutions. For example, the CIF format has a spatial resolution of 352×288 pixels, while the QCIF format has a spatial resolution of 176×144 pixels. The QCIF format, although being of lower image quality, may allow for real-time transmission of an image under low-bandwidth conditions that do not allow real-time transmission of a CIF signal.

The coding apparatus of FIG. 9 is arranged to allow the coding and storage of the same video signal at a variety of different bit rates. In particular, the video signal is coded using different spatial resolutions using coders 200a and 200b, respectively. As shown, the output of coder 200a is stored in memory unit 240a and the output of coder 200b is stored in memory unit 240b. Once the video signal is coded and stored, the stored signals may be used as part of a video-on-demand server to provide the same video signal at different bit rates The coders 200a and 200b are each designed for coding data with a different level of spatial resolution, so that each provides video data for transmission at a different bit rate. In general, the greater the number of pixels used for each frame of video, the higher the quality of the transmitted image, and the higher the bit rate. Thus, in the tradeoff between image quality and transmission bandwidth, the quality of a transmission channel often determines the spatial resolution that will allow real-time decoding and display at the receiving end of the transmission. If a variety of bit rates are available, handshaking commands between the destination and the source can be used to select the highest bit rate tolerable by the transmission channel (for real-time decoding), thereby providing the best possible image quality.

In the FIG. 9 embodiment, coder 200a codes the video signal with a QCIF level of spatial resolution. This results in its output having a lower bit rate than the output of coder 200b, which is coded at a spatial resolution defined by the CIF format. Thus, if a transmission channel being used allows only a relatively low bit rate, the decoder sends a request for the coded version of the video signal having the QCIF bit rate (i.e., the signal coded by coder 200a). However, if the channel will allow the higher bit rate of the signal coded using coder 200b, the decoder sends a request for the higher bit rate signal stored in memory unit "B" 240.

To allow a single input to be used by both coders 200a, 200b, the input signal provided is preferably a CIF signal. This signal may then be input directly to coder 200b. For coder 200a, an SRC unit 242 is used to convert the CIF signal to a QCIF version of the same signal, that may then be used to encode the output to memory unit 240a. The conversion performed by unit 242 is known in the art, and is not described in any further detail herein. In this embodiment, it is not necessary for the two coders 200a, 200b to use different level of quantization, since a significant difference in bit rates comes from the difference in spatial resolution. Thus, in the preferred version of this embodiment, the quantizers 216a, 216b have similar coarseness of quantization.

For generating a periodic LBIF to be stored by memory unit 240b, the output from the inverse DCT 218a of coder 200a is input to SRC unit 244. SRC unit 244 converts the data for a particular LBIF frame from QCIF to CIF mode and, periodically, a frame of this image data is switched into the input bitstream of coder 200b via switching element 232. The conversion of QCIF frames to CIF mode is known in the art, and is not discussed in any further detail herein. Since the spatial resolution of the QCIF signal is much less than that of the CIF signal, the QCIF frame is essentially magnified for input to the CIF coder. This magnification results in a frame of lower image quality than a corresponding frame in CIF mode, due to the lower spatial resolution. Thus, even though this frame is represented at the higher resolution level of the CIF coder 200b, the higher spatial resolution frame has the image characteristics of a corresponding frame at a QCIF spatial resolution.

In another alternative embodiment of the invention, frames are not generated, reconstructed and inserted in a second bitstream in the manner described above. Instead, a separate set of transition frames are generated and used to change between bitstreams of different bit rates during a video-on-demand playback. These frames are referred to herein as "switch" frames or, more simply, "S-frames." A coder for coding bitstreams at two different bit rates, while also coding the desired S-frames, is shown in FIG. 10.

Figure 10:
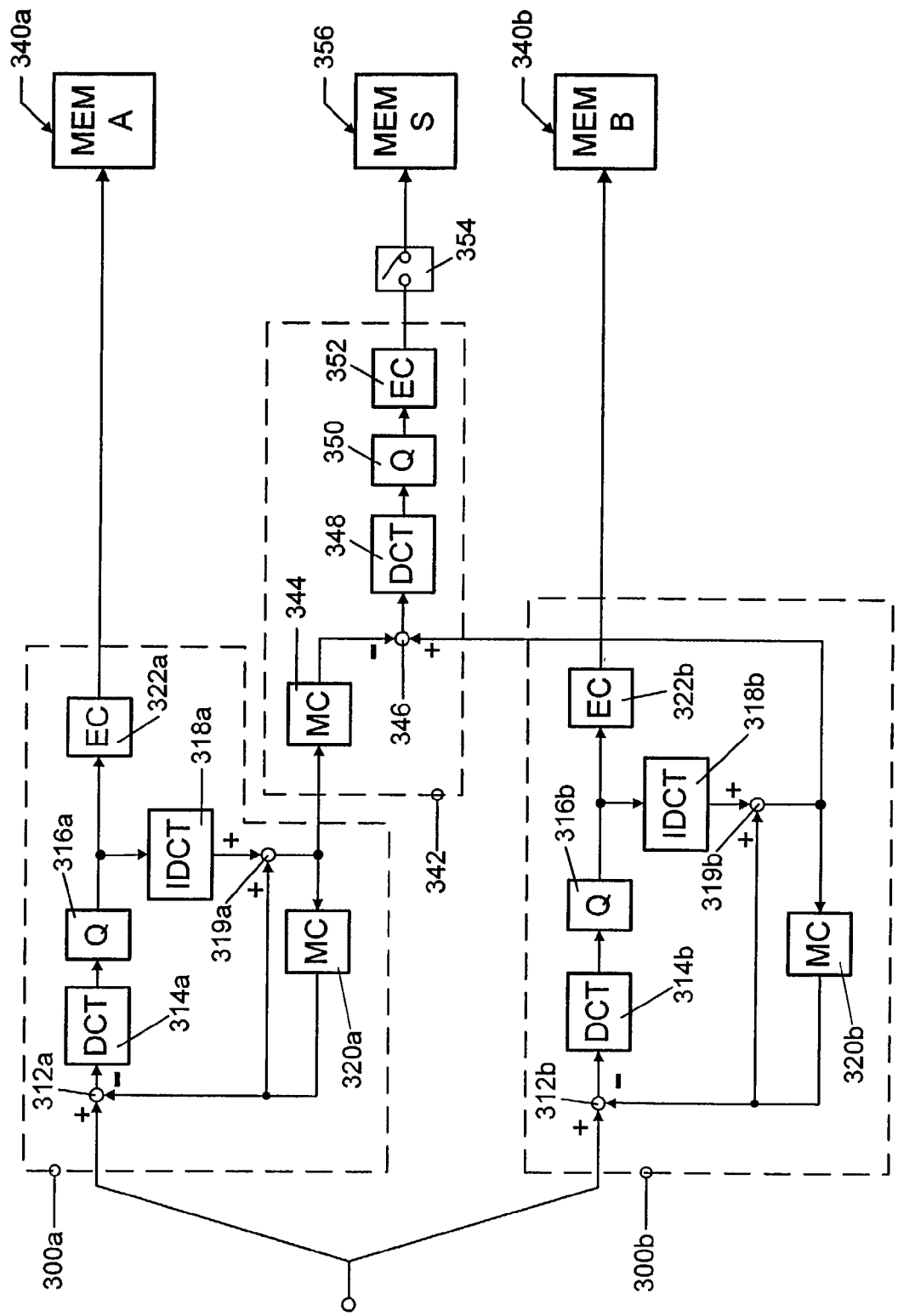
FIG. 10 is a schematic view of a scalable interframe coding apparatus according to an alternative embodiment of the invention in which S-frames are separately generated and stored.
Figure 13:
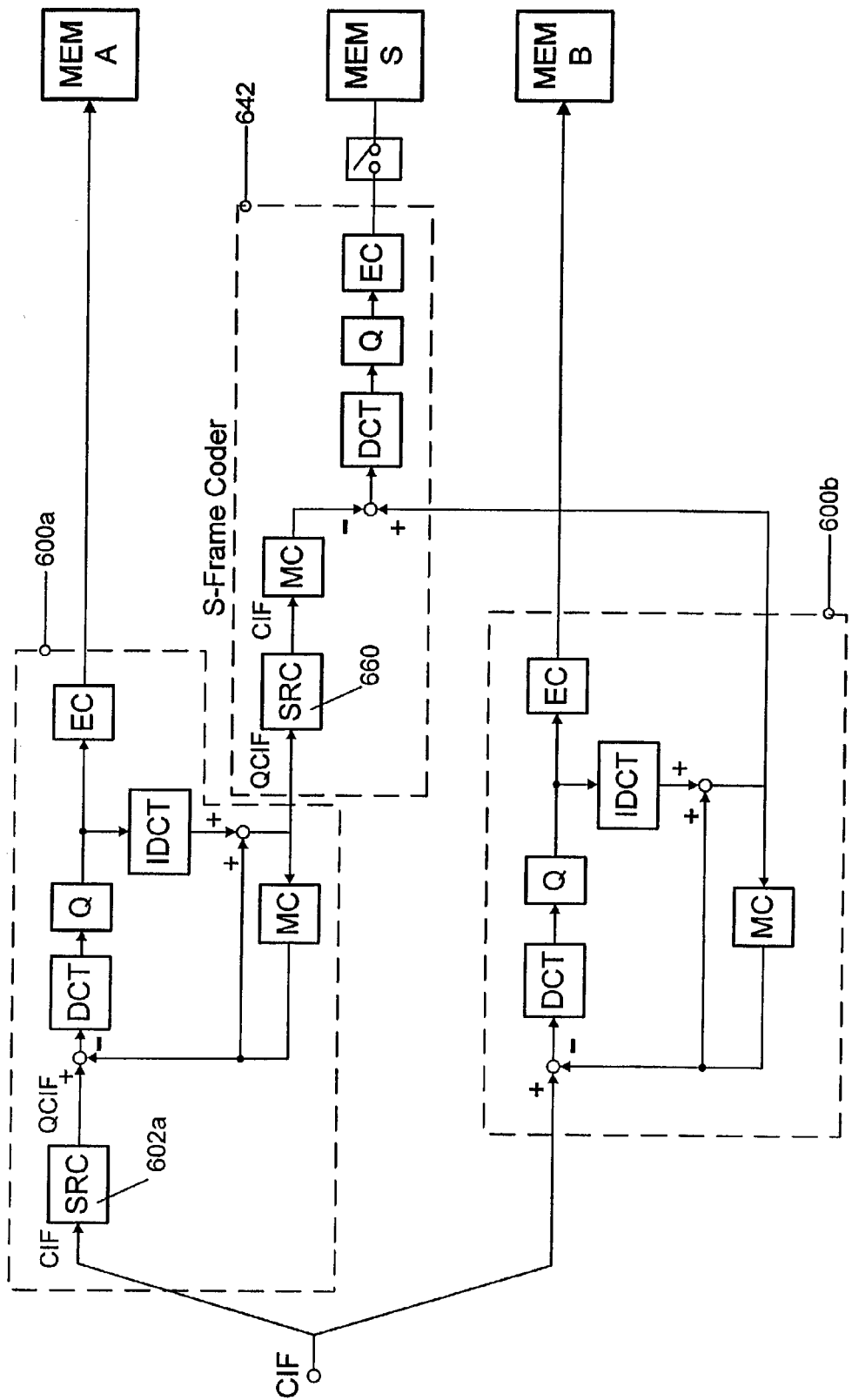
FIG. 13 is a schematic view of a scalable interframe coding apparatus according to the present invention that is similar to that of FIG. 10 and that makes use of reference picture resampling elements.

In the embodiment of FIG. 10, the different bit rates of the two bitstreams come from the difference in coarseness of quantization between coder 300a and coder 300b. Thus, there are no SRC units shown in this figure, although an S-frame coder that codes at different spatial resolutions is shown in FIG. 13. As shown, FIG. 10 coder 300a is of a standard arrangement having a summing node 312a, DCT 302a, quantizer 316a, inverse DCT 318a and summing node 319a, as well as motion compensation element 320a and entropy coder 322a. The quantizer 316a of coder 300a has a relatively high coarseness of quantization, and therefore a relatively low bit rate bitstream is stored in memory unit A 340a. Coder 300b consists of summing node 312b, DCT 302b, quantizer 316b, and inverse DCT 318b, as well as motion compensation element 320b and entropy coder 322b. The quantizer 316b has a relatively low coarseness of quantization, and therefore a relatively high bit rate bitstream is stored in memory unit B 340b.

In addition to the coders 300a, 300b, the apparatus of FIG. 10 also includes an S-frame coder 342. The S-frame coder receives the output of summing node 319a of coder 300a, and inputs it to motion compensator 344. Like motion compensator 320a, motion compensator 344 generates a prediction from the reconstructed frame of encoder 300a. However, the output that is received at summing node 346 is different from the output received at summing node 312a due to the use of different displacement vectors in motion compensator 344 than in motion compensator 320a. The displacement vectors used in motion compensator 344 are selected such that a close approximation of the reconstructed frame from coder 300b is obtained.

Also received at summing node 346 is the output from summing node 319b of coder 300b. At summing node 346, the signal from coder 300a is subtracted from the signal from coder 300b. For each frame, the result is a frame of image data that is the difference between the high-bit rate image data and the motion compensated low-bit rate data. This difference data is then compressed using DCT 348, quantizer 350 and entropy coder 352, and results in an S-frame that provides a point of continuity for two time indexes in the bitstreams of coder 300a and coder 300b. In the preferred version of this embodiment, S-frames are only stored periodically, that is, not every frame of the original video sequence is converted to an S-frame. To demonstrate that S-frames are only periodically stored, a switch element 354 is shown between the output of entropy coder 352 and memory unit "S" 356. By only periodically enabling the switching element 354, the S-frames are only periodically stored in the memory 356. Those skilled in the art will recognize that switch 354 is only a representation of a means to periodically store S-frame data, and that it is likely that an actually embodiment would not use a switch element, but rather a software or firmware element that controls the storage of the S-frames.

Figure 11:
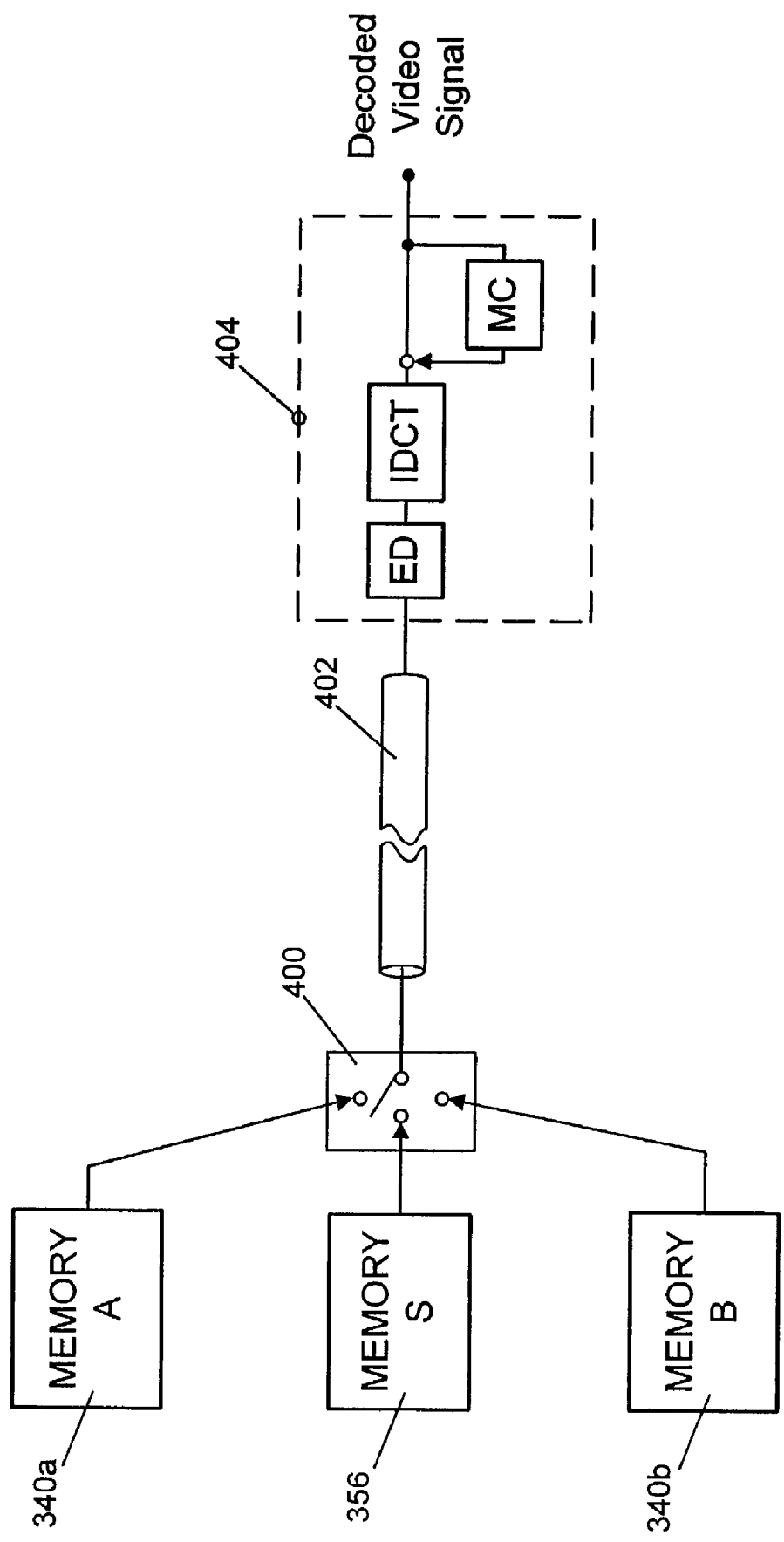
FIG. 11 is a schematic view of a video-on-demand server apparatus according to an alternative embodiment of the invention in which S-frames are transmitted and used for bit rate transitions.

The S-frames stored by the coding apparatus of FIG. 10 function as points of continuity between a high-bit rate bitstream and a low-bit rate bitstream, and allow graceful switching from the low bit rate to the high bit rate bitstream during playback. FIG. 11 is a schematic depiction of a playback system for a video bitstream using S-frames. The particular bitstream being played back is selected by switching element 400. When the video is being played back from memory unit 340a (i.e. the lower bit rate bitstream, and a switch to a higher bit rate (i.e., higher quality) bitstream is requested, the switching element 400 changes the selected input source. However, before switching to memory unit 340b, a single S-frame from the appropriate time position is transmitted from memory unit S 356. Since the S-frames only exist at predetermined points in the time progression of the video sequence, the switch from low to high bit rate bitstreams can take place at the next appropriate point in time following receipt of the request. This transition is more easily understood by making reference to FIG. 12.

Figure 12:
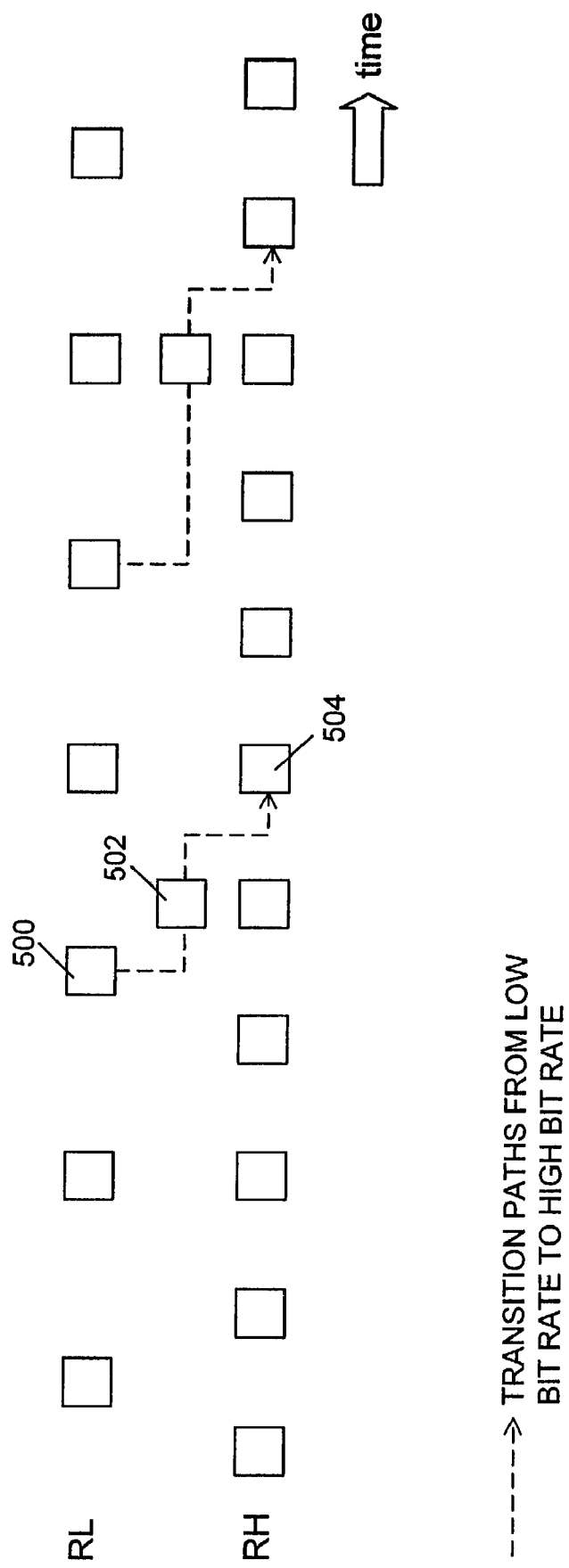
FIG. 12 is a diagrammatic view of bitstreams that are decoded using an S-frame architecture according to the present invention, the diagram showing transition paths for switching between the bitstreams.

FIG. 12 is a schematic depiction of two bitstreams and one manner in which switching between them using S-frames takes place. This figure is similar to FIG. 4, and shows representations of bitstream RL (a relatively low bit rate bitstream, such as that output by memory unit 340a of FIG. 11) and bitstream RH (a relatively high bit rate bitstream, such as that output by memory unit 340b of FIG. 11). If, during playback of the video sequence from memory 340a, a request is received for an increase in the quality of the video image, it is desirable to change from the output transmission from memory unit 340a to the output of memory unit 340b. However, to prevent the generation of artifacts stemming from the differences in image quality between the two bitstreams, an S-frame is transmitted to the decoder prior to the first frame received at the higher bit rate.

To preserve continuity between the frames being transmitted, the S-frame inserted between the frame from bitstream RL and the frame from bitstream RH must be from the correct temporal position in the video sequence. Thus, a temporal position in the bitstreams at which the transition is selected to begin corresponds to the temporal positions of the stored S-frames. For example, given the image sequences shown in FIG. 12, a last frame to be transmitted at the low bit rate might be frame 500. The next frame to be transmitted would be from the memory 356 containing the S-frames, and it would be S-frame 502, which is in a temporal position of the sequence shortly after that of frame 500. Thereafter, a high bit rate frame 504 having a temporal position shortly after that of frame 502 could be transmitted, after which the transmission would continue with subsequent frames of bitstream RH.

The use of S-frames in a scalable video transmission system allows the switching from a low-quality/low-bit rate bitstream to a high-quality/high-bit rate bitstream during the transmission of a single video sequence, while avoiding visual artifacts in the image that might otherwise occur. Since predictive coding is used in the storage and the playback of the bitstreams, the data present in a given S-frame is that necessary to reconstruct the higher bit rate frame from the lower bit rate frame. This is demonstrated by the following example.

A sequence of frames in a high bit rate datastream can be said to exist at a sequence of points (or "time indexes") in the temporal scale of the video sequence, i.e., $t_1, t_2, t_3, t_4$, etc. These frames may then be designated $h_1, h_2, h_3, h_4$, etc. A lower bit rate datastream that has a lower image quality may have frames existing at the same points in the temporal scale of the video sequence. The lower bit rate bitstream may also have a lower frequency of frames than the high bit rate bitstream. For example, if the lower bit rate bitstream had only half the number of frames, residing at temporal points $t_1, t_3, t_5$, etc., then these lower bit rate frames could be designated $l_1, l_3, l_5$, etc. The construction of an S-frame "$S_4$" by coder 342 (FIG. 10) that allowed a transition at time $t_4$ could then be represented as follows:

$$s_4 = h_4 - l_3$$

To switch from low quality to high quality during the decoding, the sequence of transmitted frames could then be:

$$l_3, s_4, h_5$$

The frame decoded at $t_4$ by decoder 404 (FIG. 11) would then be:

$$d_4 = l_3 + s_4 = l_3 + h_4 - l_3 = h_4$$

Thus, the correct data is present for decoding the next frame in the high bit rate data sequence, namely $h_5$. Of course, the exact reconstruction of $h_4$, as described in the above example, is not possible for common interframe coders due to lossy coding stages. However, this example amply demonstrates the theory of the invention and, additional technical distinctions will be apparent to those skilled in the art.

The representation of FIG. 12 demonstrates the switching sequence described above. As shown, in this embodiment, the switching from low bit rate frame to S-frame to high bit rate frame keeps progressing forward in time. Thus, the S-frame 502 provides the appropriate image data so that the decoding of the S-frame 502 after the decoding of the low bit rate frame 500 has the same effect as if a frame of bitstream RH that is prior in time to frame 504 had been decoded.

The decoding strategy demonstrated in FIG. 12 also applies to situations in which the low bitstream has the same number of frames as the high bitstream. As long as the overall decoding continues to progress forward in time through the video sequence, the appropriate prediction errors will be provided. FIG. 12 also applies to situations in which the spatial resolution of the different video sequences is the part or sole contributor to the difference in bit rates between bitstreams. Thus, an S-frame coder will function in essentially the same way to accommodate different degrees of quantization or different spatial resolutions, or both.

The coder of FIG. 13 is identical to the coder of FIG. 10, but uses SRC units and accommodates bit rate differences resulting from differences in spatial resolution. As shown, SRC unit 602a is used in coder 600a to convert from a CIF spatial resolution format to a QCIF spatial resolution format.

For coding of the S-frames, S-frame coder 642 uses SRC unit 660 to convert from a QCIF spatial resolution format to a CIF spatial resolution format. This ensures the necessary conversions during coding of the different bitstreams and the S-frames.

Another variation of the S-frame coder may be used without motion compensation. For either the coder of FIG. 10 or the coder of FIG. 13, the system may be used so that points of exact temporal continuity exist between the high bitstream, the S-frame and the low bitstream. That is, S-frames are coded at temporal points in the video sequence at which both a low bit rate or a high bit rate frame are also encoded (in a system with more than two bit rates, it would be the next highest and the next lowest bit rate bitstreams that would have to have frames encoded at the same time index). Using these points of temporal continuity, it is possible to switch either from the high bit rate bitstream to the low bit rate bitstream, or vice versa. This is demonstrated in FIG. 14.

Figure 14:
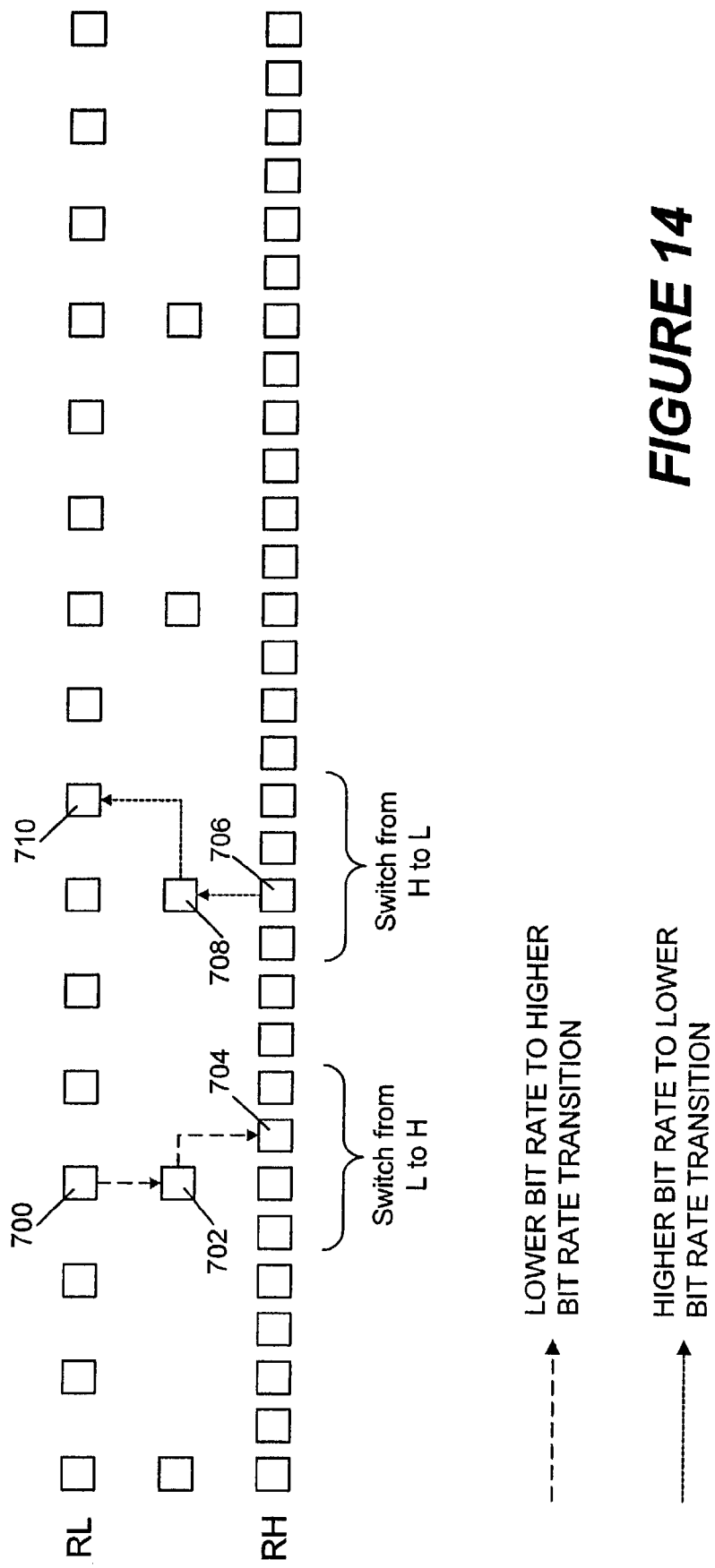
FIG. 14 is a diagrammatic view of bitstreams that are decoded using an S-frame architecture according to the present invention in an embodiment that allows two-directional transitioning between the bitstreams.

FIG. 14 is a diagram similar to FIG. 12, in which the possible transitions between bitstreams are shown. Unlike in FIG. 12, however, the S-frames in FIG. 14 represent points of exact temporal continuity between the bitstreams. That is, S-frames are present which have the same time index in the video sequence as corresponding frames in each of the high bit rate bitstream and the low bit rate bitstream. Thus, in order to transition from one bitstream to the other, it is only necessary to start from a frame of the currently transmitting bitstream, and make use of an S-frame having the same time index. The resulting frame can then be used for predictive coding of a frame in the other bitstream that is subsequent in the temporal sequence. For example, a transition from the lower bit rate bitstream to the higher bit rate bitstream is shown beginning with frame 700. From frame 700, an S-frame is then transmitted that has the same time index as frame 700. This provides the desired high bit rate bitstream data necessary to make a transition to frame 704 of the higher bit rate bitstream. Similarly, a transition from a high bit rate to a low bit rate is demonstrated beginning with frame 706 of the high bit rate bitstream. The next frame transmitted is S-frame 708, which has the same time index as frame 706, after which frame 710 of the low bit rate bitstream is transmitted. However, it can be seen that S-frame 702 also could be used to transition from the high bit rate bitstream to the low bit rate bitstream, and S-frame 708 could be used to transition from the low bit rate bitstream to the high bit rate bitstream.

When using S-frames to transition in either direction between two bitstreams, a distinction must be made for decoding purposes. In this embodiment, an S-frame is constructed by subtracting a lower bit rate frame from a higher bit rate frame at the same time index. Therefore, during transition from a lower bit rate bitstream to a higher bit rate bitstream, the decoder processes the S-frame like any other predictive frame, adding it to the frame in the decoder buffer. Since the S-frame has the same time index, motion compensation is unnecessary. However, if the transition is from a higher bit rate bitstream to a lower bit rate bitstream, the inverse of the S-frame is needed since the S-frame, in fact, must be subtracted from the frame in the decoder buffer to provide the appropriate frame data for the transition.

Figure 15:
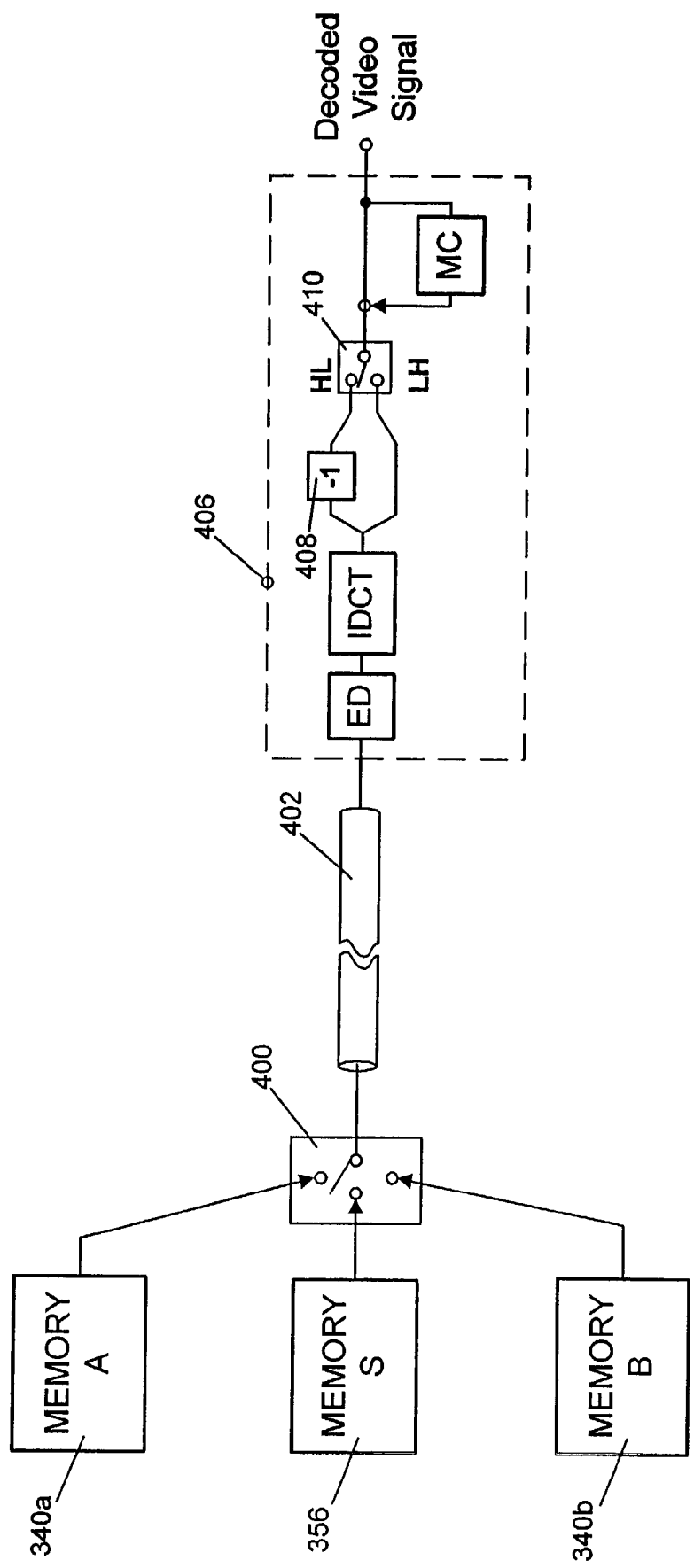
FIG. 15 is a schematic view of a video-on-demand server apparatus used according to an alternative embodiment of the invention in which two-directional transitioning between bitstreams is allowed.

Shown in FIG. 15 is a decoder that is arranged to allow S-frame transition between two bitstreams, and that can accommodate transitions from a lower bit rate bitstream to a higher bit rate bitstream, as well as from a higher bit rate bitstream to a lower bit rate bitstream. Memory A 340a, Memory B, 340b and Memory S 356 are all input to switching element 400, just as in FIG. 11. Of course, in this embodiment, the bitstreams stored in each of the memories 340a, 340b, 356 conform to the encoding restrictions described above for allowing transitions from high to low bit rates, as well as from low to high bit rates. When a change in bit rate is requested, the switching mechanism 400 changes the input from the memory that was initially transmitting, to the S-frame memory 356, doing so at a time index at which an S-frame is present. After transmission of the S-frame, the switch then changes the input to the memory having the other bit rate bitstream, which begins outputting data from a frame immediately subsequent to the S-frame in the video sequence.

Depending on whether the transition is from a low bit rate to a high bit rate, or from a high bit rate to a low bit rate, the decoder will process either the S-frame or its inverse. As shown in the figure, the decoder 406 is similar to decoder 404 of FIG. 11, using both an entropy decoder and an inverse DCT. Notably, the motion compensation element of this decoder is not used while processing the S-frame data, since it is from the same time index in the video sequence as the previously decoded frame.

In the decoder 406, the data is directed along two parallel paths to a switching element 410. One path leads directly to the switching unit, with the decoded data being unchanged. The other passes through inverter 408, which converts the image data it receives to its inverse. Which of these two data outputs is used is determined through control of the switching element 410. When a transition between bitstreams is from a low bit rate to a high bit rate, no inversion of the S-frame data occurs (i.e., the switching unit 410 directs the non-inverted data to the decoder output). When the transition is from a high bit rate to a low bit rate, the output is taken from the switch position labeled "HL" in FIG. 15 while the S-frame is being decoded. That is, the S-frame data is inverted, thereby accounting for the fact that the S-frame was constructed by subtracting a lower bit rate frame from a higher bit rate frame at the same time index.

Figure 16:
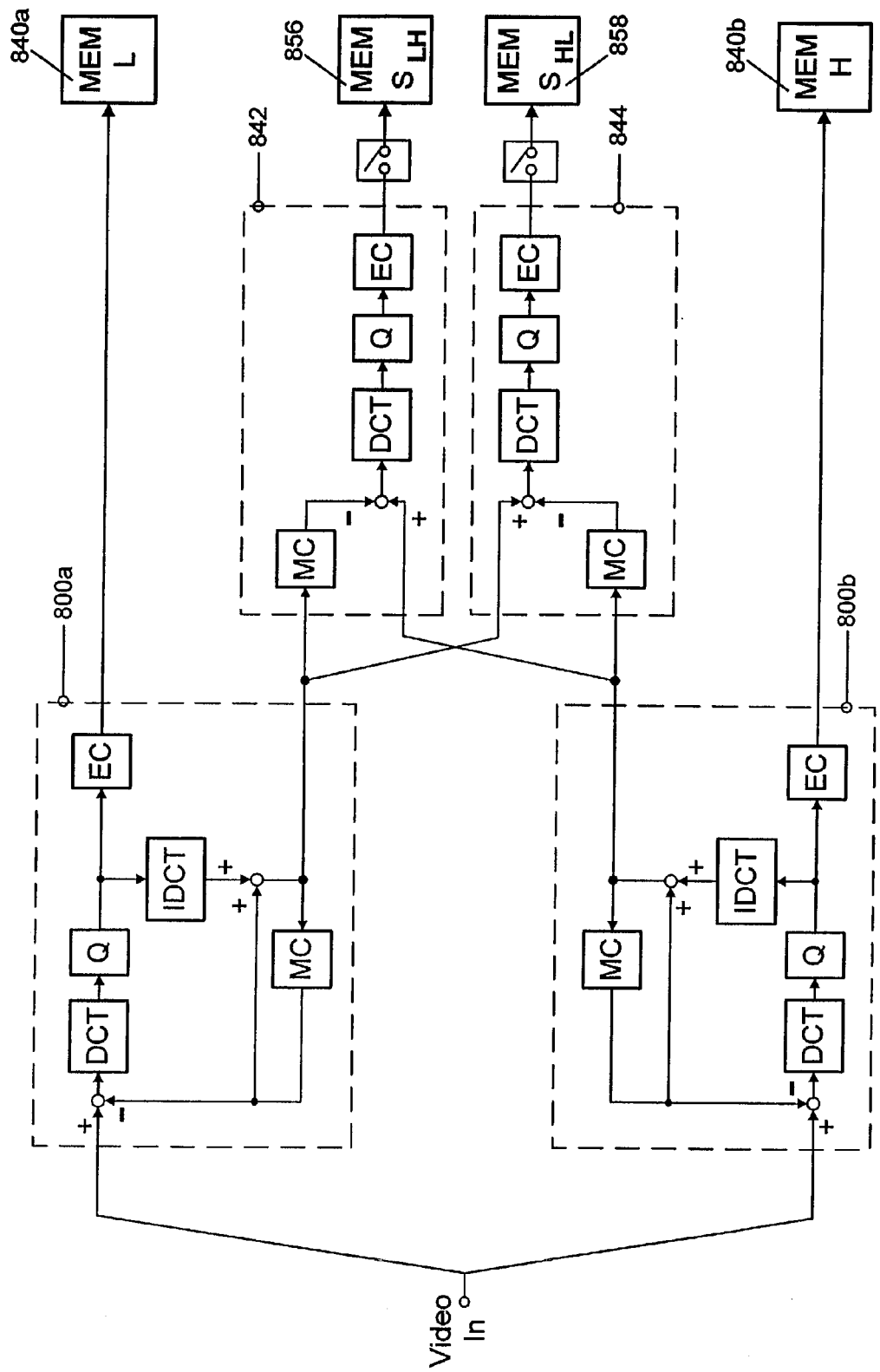
FIG. 16 is a schematic view of a scalable interframe coding apparatus according to another alternative embodiment of the invention in which two sets of S-frames are encoded, each allowing transitioning in one direction between two bitstreams.

Yet another embodiment of the invention is shown in FIG. 16, which is a coder that creates two sets of S-frames. The coder arrangement of FIG. 16 provides S-frame data that allows switching from either a higher bit rate bitstream to a lower bit rate bitstream, or from a lower bit rate bitstream to a higher bit rate bitstream, without requiring exact temporal continuity between the S-frames and the bitstreams. The system of FIG. 16 is similar to that of FIG. 10, having a low bit rate bitstream coder 800a, a high bit rate bitstream coder 800b and an S-frame coder 842 that generates S-frame data for transitioning from a lower bit rate bitstream to a higher bit rate bitstream. The system also includes a second S-frame coder 844 that generates S-frame data that may be used for transitioning from a higher bit rate bitstream to a lower bit rate bitstream. In this second coder 844, each S-frame is the result of subtracting a motion compensated higher bit rate frame from a lower bit rate frame. In some sense, it is the inverse of an S-frame generated by S-frame coder 842. This data is stored in a second S-frame memory unit 858, while the S-frame data from coder 842 is stored in memory unit 856.

Having two different sets of S-frames allows S-frame transitions between two different bitstreams regardless of whether the transition is from a lower bit rate to a higher bit rate, or vice versa. Furthermore, because two different sets of S-frame data are used for these two different types of transitions, it is not necessary that the S-frames be coincidental in the time sequence of the video with frames from both the lower bit rate bitstream and the higher bit rate bitstream. Thus, transitions such as that shown in FIG. 12 (i.e., those advancing forward in the time index in each transition from a first bitstream frame to an S-frame, and then from the S-frame to the next bitstream frame) may take place either from a lower bit rate to a higher bit rate or a higher bit rate to a lower bit rate. During decoding, in a transition from a lower bit rate to a higher bit rate S-frame data from memory 856 is used, while in a transition from a higher bit rate to a lower bit rate S-frame data from memory 858 is used.

While the invention has been shown and described with reference to a preferred embodiment thereof, those skilled in the art will recognize that various changes in form and detail may be made herein without departing from the spirit and scope of the invention as defined in the appended claims. For example, the description of the invention makes reference to either two or three separate coded bitstreams. Obviously, however, any number of bitstreams having different bit rates can be used. Different LBIFs or S-frames may be used to transition between different pairs of bitstreams. Furthermore, the coder/decoder apparatus are shown schematically, but those skilled in the art will understand that there are numerous ways to implement the invention, including using different types of coders. In addition, other types of compression and error compensation may also be used in combination with the system described herein without exceeding the scope of the present invention.

One notable type of modification considered to be within the scope of the invention is the optimization of various components in the system. For example, the residual prediction error coded in an S-frame coder has different statistical properties than the prediction error signal that is coded in a typical interframe coder. This is caused by the different quantization and/or spatial resolution of the bitstreams that are linked by S-frames, and may be evidenced, for instance, by the probability density function of the error signal for S-frames being typically less peaked towards small values. Statistical differences such as these can be exploited to achieve more efficient coding of S-frames. Known optimization methods, such as the design of a Lloyd-Max quantizer for the quantization stage or the design of a Huffman coder for the entropy coding stage, are examples of optimization steps. Given the foregoing disclosure, these and other optimization steps would be readily adaptable by those skilled in the art, and such variations are considered to be within the scope of the invention.

The invention claimed is:

1. An apparatus for interframe coding a video signal comprising:

a first interframe coder operative to receive and interframe code an input video signal to generate a first interframe coded bitstream having a first bit rate;

a second or an additional interframe coder operative to receive the video signal and interframe code the input video signal to generate a second interframe or an additionally coded bitstream having a second bit rate which is different than the first bit rate, such that each of the first and second bitstreams is an independently viewable version of the video signal; and a switch frame coder that interframe codes transition data that, when decoded by an interframe decoder that was used to decode the first bitstream immediately prior thereto, compensates for visual discrepancies between a decoded version of the first bitstream and a decoded version of the second bitstream, such that decoding of the second bitstream with said decoder immediately after decoding the transition data provides a continuous video sequence without visual artifacts that would otherwise be present due to the difference in the bit rates of the first and second bitstreams.

2. An apparatus according to claim 1 wherein the video sequence comprises a plurality of different bitstreams each having a different bit rate and data organized in a plurality of temporally sequential spatial frames.

3. An apparatus according to claim 1 wherein the first bitstream and the second bitstream are each coded with a different coarseness of quantization.

4. A video decoder apparatus for providing digital motion video at a plurality of different bit rates, the apparatus comprising:
- a video interframe decoder that decodes interframe coded video data to a viewable video sequence; and
- a switching module that selects the source of said interframe coded video data during a transition from one bitstream to another, the switching module selecting:
  - a first bitstream that was interframe coded from an input video signal to allow transmission at a first bit rate and that, when decoded, corresponds to a predetermined video sequence;
  - a second bitstream, after selection of the first bitstream, that was interframe coded from said input video signal to allow transmission at a second bit rate different than the first bit rate, the second bitstream comprising video data that, when decoded, provides a continuation of said predetermined video sequence; and
  - transition data that is decoded after decoding the first bitstream and before decoding the second bitstream, the decoded transition data compensating for visual discrepancies between a decoded version of the first bitstream and a decoded version of the second bitstream, such that decoding of the second bitstream immediately after decoding the transition data provides a continuation of the predetermined video sequence without visual artifacts that would otherwise be present due to the difference in the bit rates of the first and second bitstreams.

5. A decoder according to claim 4 wherein the first bitstream, the second bitstream and the transition data are transmitted over a network from a remote server.

6. A decoder according to claim 4 wherein the transition data comprise the difference between a frame of data from the first bitstream and a frame of data from the second bitstream.

7. A decoder according to claim 6 wherein the frame of data from the first bitstream and the frame of data from the second bitstream both represent the same time index in the video sequence.

8. A decoder according to claim 4 further comprising a frame inverter that, when invoked, inverts the frame of transition data prior to its decoding.

9. A video decoder for providing digital motion video at a plurality of different bit rates, the decoder having a computer readable medium comprising:
- a first instruction set that requests a first bitstream that was interframe coded from an input video signal, the first bitstream comprising video data that, when decoded, corresponds to a first predetermined video sequence;
- a second instruction set that requests a second bitstream that was interframe coded from said input video signal and that has a second bit rate different than the first bit rate, the second bitstream comprising video data that, when decoded, provides a continuation of said predetermined video sequence; and
- a third instruction set that requests transition data to be decoded after decoding the first bitstream and before decoding the second bitstream, the transition data compensating for visual discrepancies between a decoded version of the first bitstream and a decoded version of the second bitstream, such that decoding of the second bitstream immediately after decoding the transition data provides a continuation of the predetermined video sequence without visual artifacts that would otherwise be present due to the difference in the bit rates of the first and second bitstreams.

10. A decoder according to claim 9 wherein the requests issued by the first, second and third instruction sets are transmitted over a network to a remote server.

11. A decoder according to claim 9 wherein the transition data comprise the difference between a first frame of data from the first bitstream and a second frame of data from the second bitstream.

12. A decoder according to claim 11 wherein said first frame of data and said second frame of data each represent one particular time index in the video sequence.

13. A decoder according to claim 9 further comprising a frame inverter that, when invoked, inverts the frame of transition data prior to its decoding.

14. An apparatus for interframe coding a video sequence, comprising:
- a first interframe coder that receives and interframe codes an input video signal with a first spatial resolution to generate a first interframe coded bitstream having a first bit rate;
- a second interframe coder that receives the video signal and interframe codes the input video signal with a second spatial resolution to generate a second interframe coded bitstream having a second bit rate which is different than the first bit rate, such that each of the first and second bitstreams is an independently viewable version of the video signal at a different spatial resolution; and
- a switch frame coder that interframe codes transition data that, when decoded by an interframe decoder that was used to decode the first bitstream immediately prior thereto, compensate for visual discrepancies between a decoded version of the first bitstream and a decoded version of the second bitstream, such that decoding of the second bitstream with said decoder immediately after decoding the transition data provides a continuation of the video sequence without visual artifacts that would otherwise be present due to the difference in the spatial resolutions of the first and second bitstreams.

15. An apparatus according to claim 14 further comprising a memory storage element in which data of the first bitstream is stored.

16. An apparatus according to claim 14 further comprising a memory storage element in which data of the second bitstream is stored.

17. An apparatus according to claim 14 further comprising means for transmitting the first bitstream and the second bitstream simultaneously over a transmission channel.

18. An apparatus according to claim 14 wherein the second bit rate is higher than the first bit rate.

19. A method of providing digital motion video at a plurality of different bit rates, the method comprising:
- decoding a first bitstream that was interframe coded from an input video signal, the first bitstream comprising video data that, when decoded, corresponds to a first predetermined video sequence;
- decoding a second bitstream that was interframe coded from said input video signal and that has a second bit rate different than the first bit rate, the second bitstream comprising video data that, when decoded, provides a continuation of said predetermined video sequence; and
- decoding transition data after decoding the first bitstream and before decoding the second bitstream, the transition data compensating for visual discrepancies between a decoded version of the first bitstream and a decoded version of the second bitstream, such that decoding of the second bitstream immediately after decoding the transition data provides a continuation of the predetermined video sequence without visual artifacts that would otherwise be present due to the difference in the bit rates of the first and second bitstreams.

20. A method according to claim 19 wherein the first bitstream, the second bitstream and the transition data are received over a network from a remote server.

21. A method according to claim 19 wherein the transition data comprise the difference between a first frame of data from the first bitstream and a second frame of data from the second bitstream.

22. A method according to claim 21 wherein said first frame of data and said second frame of data each represent one particular time index in the video sequence.

23. A method according to claim 19 further comprising inverting the frame of transition data prior to its decoding.

* * * * *

UNITED STATES PATENT AND TRADEMARK OFFICE
CERTIFICATE OF CORRECTION

| | |
|---|---|
| PATENT NO. | : 7,075,986 B2 |
| APPLICATION NO. | : 10/292257 |
| DATED | : July 11, 2006 |
| INVENTOR(S) | : Bernd Girod et al. |

It is certified that error appears in the above-identified patent and that said Letters Patent is hereby corrected as shown below:

On the Title Page, Item (75), the spelling of inventor's name "Yuriy A. Resznik" should be changed to --Yuriy A. Reznik--.

Signed and Sealed this
First Day of May, 2012

David J. Kappos
*Director of the United States Patent and Trademark Office*